US006803555B1

(12) United States Patent
Parrish et al.

(10) Patent No.: US 6,803,555 B1
(45) Date of Patent: Oct. 12, 2004

(54) TWO-STAGE AUTO-ZERO AMPLIFIER CIRCUIT FOR ELECTRO-OPTICAL ARRAYS

(75) Inventors: William J. Parrish, Santa Barbara, CA (US); Naseem Y. Aziz, Goleta, CA (US)

(73) Assignee: Indigo Systems Corporation, Goleta, CA (US)

( * ) Notice: Subject to any disclaimer, the term of this patent is extended or adjusted under 35 U.S.C. 154(b) by 123 days.

(21) Appl. No.: 09/949,320

(22) Filed: Sep. 7, 2001

(51) Int. Cl.[7] .............................................. H01J 40/14
(52) U.S. Cl. ........................ 250/214 C; 250/214 AG; 330/308
(58) Field of Search ...................... 250/214 A, 214 LS, 250/214 DL, 214.1, 214 AG, 208.1, 214 C; 348/300, 302, 241, 255; 341/150; 330/308, 9, 100, 310; 327/124, 563

(56) References Cited

U.S. PATENT DOCUMENTS

| | | | |
|---|---|---|---|
| 4,958,133 A | * | 9/1990 | Bazes ........................ 330/253 |
| 5,027,116 A | * | 6/1991 | Armstrong et al. ............ 330/9 |
| 5,448,056 A | * | 9/1995 | Tsuruta .................... 250/208.1 |
| 5,708,376 A | * | 1/1998 | Ikeda ........................ 327/337 |
| 5,914,633 A | * | 6/1999 | Comino et al. ............. 327/552 |
| 6,271,784 B1 | * | 8/2001 | Lynn et al. ................. 330/150 |
| 6,344,651 B1 | * | 2/2002 | Woolaway et al. .......... 250/332 |
| 6,384,401 B1 | * | 5/2002 | Jensen ..................... 250/214 A |
| 6,396,733 B1 | * | 5/2002 | Lu et al. .................... 365/158 |
| 6,400,301 B1 | * | 6/2002 | Kulhalli et al. ............ 341/155 |
| 6,426,991 B1 | * | 7/2002 | Mattson et al. ............... 378/19 |

* cited by examiner

*Primary Examiner*—David Porta
*Assistant Examiner*—Stephen Yam
(74) *Attorney, Agent, or Firm*—MacPherson Kwok Chen & Held LLP; Greg J. Michelson

(57) ABSTRACT

Two-stage auto-zero amplifier circuits are disclosed, along with methods of auto-zeroing such amplifier circuits. The two-stage auto-zero amplifier circuit may be part of an electronics signal chain coupled to a detector element to process an electronic signal induced by illumination. In an exemplary embodiment, the auto-zero amplifier circuit includes a first stage, which includes a low-noise fixed gain amplifier, capacitively coupled to a second stage, which includes a high gain amplifier. In an exemplary embodiment of a method of auto-zeroing the two-stage auto-zero amplifier circuit, a first terminal of the detector element is decoupled from the auto-zero amplifier circuit, and the first stage of the auto-zero amplifier circuit is locally referenced to a second terminal of the detector element. An auto-zero voltage for the auto-zero amplifier circuit is stored between the first stage of the auto-zero amplifier circuit and the second stage of the auto-zero amplifier circuit.

60 Claims, 27 Drawing Sheets

TWO-STAGE AUTO-ZERO AMPLIFIER CIRCUIT FOR ELECTRO-OPTICAL ARRAYS

FIELD OF THE INVENTION

This invention relates to electro-optical detectors and in particular to amplifiers for interfacing with electro-optical detectors, such as photovoltaic detectors.

BACKGROUND

Many modern systems rely on electro-optical detectors, or sensors, to sense a portion of the electromagnetic spectrum. These systems might include telecommunications systems, fiber-optic systems, imaging systems, cameras, and other commercial and military systems. The electro-optical sensors of these systems can be critical components in determining performance, sensitivity, cost, and dynamic range of the overall system.

To achieve a very high level of performance, many modern electro-optical sensors include two primary functional components. The first component is a detector element or detector array. One detector element commonly used is a photovoltaic detector element. The second functional component is the readout multiplexer.

For electro-optical sensors operating in the visible spectrum and up to approximately 1.0 $\mu$m wavelength radiation, silicon is commonly used to fabricate both the detector (e.g., a single detector element or an array of detector elements) and the readout multiplexer. For optical sensors operating at significantly shorter or longer wavelengths, alternative semiconductor materials may be selected for the detector to provide more efficient sensitivity for the desired region of the electromagnetic spectrum. In this case, it may be desirable to use different materials to fabricate the detector and the readout multiplexer, since the readout multiplexer can still be fabricated in silicon.

Electrical signals from individual detector elements are processed by electronics signal chains, which have become increasingly sophisticated in modern electro-optical sensors. The signal chains are now designed to optimize the impedance interface to the detector elements; the integration of the electrical signals; the noise performance of the sensor; and the signal storage, multiplexing, and processing to an optimized systems interface.

FIG. 1A is a circuit diagram and FIG. 1B is a cross-sectional side view of a typical pn junction photovoltaic detector element 10. As shown in FIG. 1A, detector element 101 is a diode structure including an anode 11 and a cathode 12. A terminal 13 is electrically coupled to anode 11, and a terminal 14 is electrically coupled to cathode 12. Detector element 10 may be fabricated by diffusing a p-type region 15 into an n-type semiconductor 16, thereby forming a pn junction as shown in FIG. 1B. Since detector element 10 is a diode structure that is responsive to illumination, detector element 10 is also called a photodiode.

In electro-optical systems, an electromagnetic image is spatially sampled in units called pixels. Detector element 10 can be used to sample a single pixel at a time. Thus, detector element 10 is also sometimes referred to as a pixel. Depending on the application and the format of detector array, the image may or may not be scanned. If the image is scanned, it may be scanned in one dimension or in two dimensions. For example, to sample a line of an electro-magnetic image, a line array of detector elements 10 is provided, or the image is scanned across the single detector element 10.

FIG. 2A is a circuit diagram and FIG. 2B is a perspective view of a typical pn junction photovoltaic detector array 20. In FIG. 2A, detector array 20 includes four detector elements 10, each with terminals 13 and 14. Typical line arrays of this type in current systems may include as many as 512, or more, detector elements 10. Individual detector elements 10 are fabricated in close proximity to each other in the necessary quantity to support the system application. In FIG. 2B, four p-type regions 15 (one for each detector element 10) are shown arranged in a line and diffused into n-type semiconductor 16. Sampling of a two-dimensional image can be accomplished by fabrication of a plurality of detector elements 10 arranged in a two-dimensional array, also called a staring array. Typical two-dimensional arrays in current systems may include 1024×1024, or more, detector elements 10.

FIG. 3 is a graphical illustration of a current-voltage (IV) characteristic of pn junction photovoltaic detector element 10 of FIG. 1A under illumination. The right and left halves of the diagram are referred to as the forward bias (FB) and reverse bias (RB) regions, respectively. Under forward bias, the zero current intercept, also called the forward voltage ($V_F$), of detector element 10 is a function of the illumination level. Similarly, under reverse bias, the reverse bias current is also a function of the illumination level. The reverse bias current, however, may also include a junction leakage current component and, under high reverse bias, a reverse bias breakdown current component.

Depending on material quality and properties, the magnitudes of the leakage current and/or the reverse bias breakdown current may be as large as, or larger than, the detector element photocurrent, which is the signal of interest. The extraneous leakage and reverse bias breakdown currents may degrade performance and dynamic range of the electro-optical sensor.

For a detector with a single detector element 10, it is reasonable to interface between the readout multiplexer and detector element 10 using wires or printed circuit board traces. In one-dimensional line arrays or two-dimensional staring arrays, however, the detector element count may be as large as 512 detector elements 10, or even over one million detector elements 10, respectively. In these cases, wire and circuit board trace interfaces are unrealistic, and it is desirable to have the readout multiplexer of the electro-optical sensor in close physical proximity to detector elements 10 to facilitate electrical coupling of detector elements 10 to the readout multiplexer.

Direct electrical coupling of detector elements 10 to the readout multiplexer allows the sizes of detector elements 10 to be small, reducing the overall size of the detector array. Integrated circuit wire bonding and bump bonding techniques have been employed to achieve such electrical interfaces. FIG. 4 is a perspective illustration of an electro-optical sensor 40 including an electro-optical detector 41 in close proximity to an integrated circuit readout multiplexer 42. Detector 41 includes a plurality (i.e., an array) of detector elements 10, each of which is coupled to an electronics signal chain for processing the signal from each detector element 10.

FIG. 5 is a circuit diagram of an array 50 of four detector elements 10 (i.e., photodiodes) each coupled to an integrating amplifier 51. Each integrating amplifier 51 includes, due to materials and manufacturing variations, a unique input offset voltage (labeled $Vos_1$, $Vos_2$, $Vos_3$, and $Vos_4$, respectively) shown explicitly coupled between terminal 13 of each detector element 10 and the input of each integrating amplifier 51.

FIG. 6A is a graphical illustration of a current-voltage (IV) characteristic for array 50 of FIG. 5, for a large input offset voltage distribution. The relatively large variation in the values of the input offset voltages $Vos_1$, $Vos_2$, $Vos_3$, and $Vos_4$ of each integrating amplifier 51 is shown for illustration purposes. The effect of variations in the input offset voltages of integrating amplifiers 51 is to cause each detector element 10 to operate at a different bias point on its IV curve. The current from each detector element 10 will thus show an offset variation that is dependent on the IV characteristic of the detector element 10 and the magnitude of the input offset voltage distribution from integrating amplifiers 51. These offset currents introduce variations in the output signals for each detector element 10. In some cases, these variations can represent a significant portion of the dynamic range of the signal levels of detector elements 10.

Input offset voltages $Vos_1$, $Vos_2$, $Vos_3$, and $Vos_4$ of integrating amplifiers 51 can also affect the noise performance of respective detector elements 10. Zero-biasing detector elements 10 can, for example, optimize the 1/f noise performance of detector elements 10. High reverse bias voltage levels can produce higher leakage currents, higher Shot noise, and higher 1/f noise current levels.

For optimum detector array performance, integrating amplifiers 51 with adjustable input voltage levels and a very low input offset voltage distribution are desirable. FIG. 6B is a graphical illustration of a current-voltage (IV) characteristic for array 50 of FIG. 5, for a very low input offset voltage distribution. For uniform diode characteristics, the fight input offset voltage distribution would result in biasing of all four detector elements 10 at a unique bias point, thus producing a uniform output current as desired for optimum electro-optical sensor design.

The selection of a bias point (in the reverse bias region, or at zero bias) of detector elements 10 is made to optimize the performance of each detector element 10 and of the overall system. This "zero-biasing" of detector elements 10 can remove the dark current component from the current of each detector element 10. Since dark current is a function of the temperature of each detector element 10, zero-biasing can remove the need for temperature stabilization of the detector array. In addition, the 1/f noise of each detector element 10 can be reduced by providing an appropriate bias.

A variety of designs for integrating amplifiers 51 have been proposed to achieve the IV characteristic of FIG. 6B. The designs, however, have varied in their ability to generate both a controlled input offset voltage level and a low input offset voltage distribution. FIG. 7A is a circuit diagram of one integrating amplifier 51 coupled to one detector element 10. FIG. 7B is a circuit diagram of integrating amplifier 51 implemented as a differential amplifier 71 in a reset integrator configuration. In FIG. 7B, terminal 14 of detector element 10 is coupled to a detector reference voltage (DET_REF). Terminal 13 of detector element 10 is coupled to the inverting input (−) of differential amplifier 71. The non-inverting input (+) of differential amplifier 71 is coupled to an amplifier reference voltage (AMP_REF). A feedback capacitor 72 ($C_f$) is coupled in parallel with a switch 73, controlled by a signal RESET, between the output of differential amplifier 71 and the inverting input (−) of differential amplifier 71.

In FIG. 7B, current from detector element 10 de-biases the inverting input (−) of differential amplifier 71. The high, inverting gain of differential amplifier 71 causes the output of differential amplifier 71 to oppose the inverting input voltage change, thus generating a changing voltage across feedback capacitor 72 ($C_f$). This maintains the inverting input (−) of differential amplifier 71 at a nearly constant voltage, while the output voltage changes in response to the input current from detector element 10. Switch 73 is used to reset integrating amplifier 51 and to return the input and output voltages to a reset potential.

FIG. 8 is a timing diagram for integrating amplifier 51 of FIG. 7B. When signal RESET, which controls switch 73 of FIG. 7B, is at a potential Von, the output of integrating amplifier 51 is equal to the reset potential AMP_REF. After signal RESET transitions to a potential Voff, the current from detector element 10 pulls the inverting input (−) of differential amplifier 71 positive, causing the output of integrating amplifier 51 to go negative. The current from detector element 10 is given by $I_{det}=C_f(dV/dt)$, where dV is the change in output voltage over the integration time and dt is the integration time. The magnitude of the negative voltage output signal from integrating amplifier 51 is thus a function of the current level flowing from detector element 10, the integration time, and the size of feedback capacitor 72 ($C_f$).

A variety of differential and single-ended implementations of integrating amplifier 51 are possible. FIG. 9 is a circuit diagram of a CMOS embodiment of integrating amplifier 51 of FIG. 7B. A p-type MOSFET 91 acts as a current source for differential amplifier 71. The source and body of MOSFET 91 are coupled to a positive reference voltage VPOS. The gate of MOSFET 91 is coupled to receive a biasing signal AMP_CS1. The drain of MOSFET 91 is coupled to the sources of a p-type MOSFET 92 and a p-type MOSFET 93. MOSFETs 92 and 93 form a common source pair for differential amplifier 71. The bodies of MOSFETs 92 and 93 are coupled to VPOS. The gate of MOSFET 92, which is the inverting input (−) of differential amplifier 71, is coupled to terminal 13 of detector element 10. The current flowing in detector element 10 is denoted $I_{det}$. The gate of MOSFET 93, which is the non-inverting input (+) of differential amplifier 71, is coupled to amplifier reference voltage AMP_REF.

An n-type MOSFET 94 and an n-type MOSFET 95 serve as loads in differential amplifier 71. The sources and bodies of MOSFETs 94 and 95 are coupled to a negative reference voltage VNEG. The gates of MOSFETs 94 and 95 are coupled together. The drain of MOSFET 94 is coupled to the gate of MOSFET 94 and to the drain of MOSFET 93. The drain of MOSFET 95 is coupled to the drain of MOSFET 92, which is the output of differential amplifier 71 and of integrating amplifier 51.

As in FIG. 7B, feedback capacitor 72 ($C_f$) is coupled between the inverting input (the gate of MOSFET 92) of differential amplifier 71 and the output (the drain of MOSFET 92) of integrating amplifier 51. An n-type MOSFET 96, with a gate driven by signal RESET, serves as switch 73 in FIG. 9. MOSFET 96 is coupled in parallel with feedback capacitor 72, with one terminal coupled to the gate of MOSFET 92 and one terminal coupled to the drain of MOSFET 92.

Although the CMOS implementation of integrating amplifier 51 in FIG. 9 allows adjustable biasing of detector element 10, the implementation exhibits an input offset voltage distribution that is a function of the threshold voltages of MOSFETs 92, 93, 94, and 95. A typical input offset voltage distribution (one sigma) for the implementation of FIG. 9 may be several millivolts, which is larger than desired for optimum performance of an electro-optical detector.

Various circuits have been proposed to reduce the input offset voltage distribution further. FIG. 10A is a circuit diagram including an alternative embodiment of integrating amplifier 51 of FIG. 7A. An auto-zero coupling capacitor 101 (labeled $C_{Az}$) is coupled between terminal 13 of detector element 10 and the inverting input of a single-ended inverting amplifier 81. Switch 73, controlled by signal RESET, is coupled between the output of inverting amplifier 81 and the inverting input of inverting amplifier 81. A second switch 102, also controlled by signal RESET, is coupled between terminal 13 of detector element 10 and a reference voltage $V_{zero}$. Feedback capacitor 72 ($C_f$) is coupled between the output of inverting amplifier 81 and terminal 13 of detector element 10. The output of inverting amplifier 81 also serves as the output of integrating amplifier 51.

Resetting integrating amplifier 51 of FIG. 10A closes switches 73 and 102. This equilibrates the potentials of the inverting input of inverting amplifier 81 and the output of inverting amplifier 81. It also sets the input of integrating amplifier 51 (terminal 13 of detector element 10) to reference voltage $V_{zero}$. This stores the input offset voltage error across $C_{Az}$ capacitor 101. At the end of the reset process, switches 73 and 102 open. The input offset voltage error is still stored across $C_{Az}$ capacitor 101, and feedback capacitor 72 ($C_f$) controls the bias of the inverting input of inverting amplifier 81 as described above with reference to FIG. 7B.

FIG. 10A also shows a sample and hold stage 103 coupled between the output of integrating amplifier 51 and the input of an output amplifier 104. Sample and hold stage 103 includes a switch 105, which samples the output voltage of integrating amplifier 51 and stores the value on a capacitor 106 (labeled $C_{SH}$). Output amplifier 104 drives the signal sampled and held on capacitor 106. FIG. 10B is a block diagram of the circuit diagram of FIG. 10A. In FIG. 10B, an electronics signal chain 108 includes detector element 10, integrating amplifier 51 configured for auto-zero biasing, sample and hold stage 103, and output amplifier 104.

Auto-zero biasing, such as that implemented in FIG. 10A and FIG. 10B, can help reduce the input offset voltage distribution of the various integrating amplifiers 51 in the electronics signal chains of an array of detector elements 10. The distribution, however, is still significant, since it is largely due to variations in the charge pumping that occurs upon opening and closing switches 73 and 102 (which may be MOS switches) when resetting feedback capacitor 72 ($C_f$) and auto-zero coupling capacitor 101 ($C_{Az}$). In addition, single-ended amplifiers, such as inverting amplifier 81, cannot be locally referenced. This has limited the performance of electro-optical sensors. Accordingly, an improved auto-zero biasing amplifier and technique is desirable for optimal electro-optical sensor performance.

SUMMARY

In accordance with an embodiment of the present invention, an electronics signal chain for an electro-optical detector includes an integrating auto-zero amplifier circuit coupled to a detector element responsive to illumination. A first terminal of the detector element is coupled to a first input of the auto-zero amplifier circuit. A second terminal of the detector element is coupled to a second input of the auto-zero amplifier circuit, so that the auto-zero amplifier circuit is locally referenced to the detector element.

The auto-zero amplifier circuit includes a first amplifier, a second amplifier, and a first coupling capacitor. The first coupling capacitor is coupled between a first output of the first amplifier and a first input of the second amplifier. A first input and a second input of the first amplifier are respectively coupled to the first input and the second input of the auto-zero amplifier circuit. The first amplifier of the auto-zero amplifier circuit may be a low noise, fixed gain amplifier. The second amplifier of the auto-zero amplifier circuit may be a high gain amplifier.

In an exemplary embodiment of a method of auto-zeroing an integrating amplifier circuit, a first terminal of a detector element is decoupled from the integrating amplifier circuit, and a first stage of the integrating amplifier circuit is locally referenced to a second terminal of the detector element. An auto-zero voltage for the integrating amplifier circuit is stored between the first stage of the integrating amplifier circuit and a second stage of the integrating amplifier circuit. The auto-zero voltage may be stored differentially using one or more storage elements (e.g., capacitors).

A two-stage auto-zero amplifier circuit in accordance with an embodiment of the present invention provides an improved interface to a photovoltaic electro-optical detector element and improves the performance of a stage in the electronics signal chain that is used to process signals from the detector element. The incorporation of the first low noise, fixed gain amplifier improves the performance of the auto-zero amplifier circuit in many areas by a function of the first amplifier's fixed gain. This new approach to designing auto-zero amplifier circuits for electro-optical detectors is expected to provide a more robust interface to the detector elements. As such, this approach is expected to realize higher yields, and lower costs, as it is less sensitive to detector material quality and defects.

BRIEF DESCRIPTION OF THE DRAWINGS

This invention will be better understood by reference to the following description and drawings. In the drawings, like or similar features are typically labeled with the same reference numbers.

DETAILED DESCRIPTION

A two-stage auto-zero amplifier, which is configured as an integrating amplifier with a reset capability, can improve the interface to photovoltaic electro-optical detector elements. The first stage includes a low noise, fixed gain amplifier. The second stage includes a high gain amplifier. The two-stages are capacitively coupled to each other. An auto-zero voltage is stored differentially between the first and second stages. The incorporation of the low noise, fixed gain amplifier of the first stage improves the performance of the two-stage auto-zero amplifier in many areas by a function of the fixed gain of the first stage.

Figures 7A, 7B:
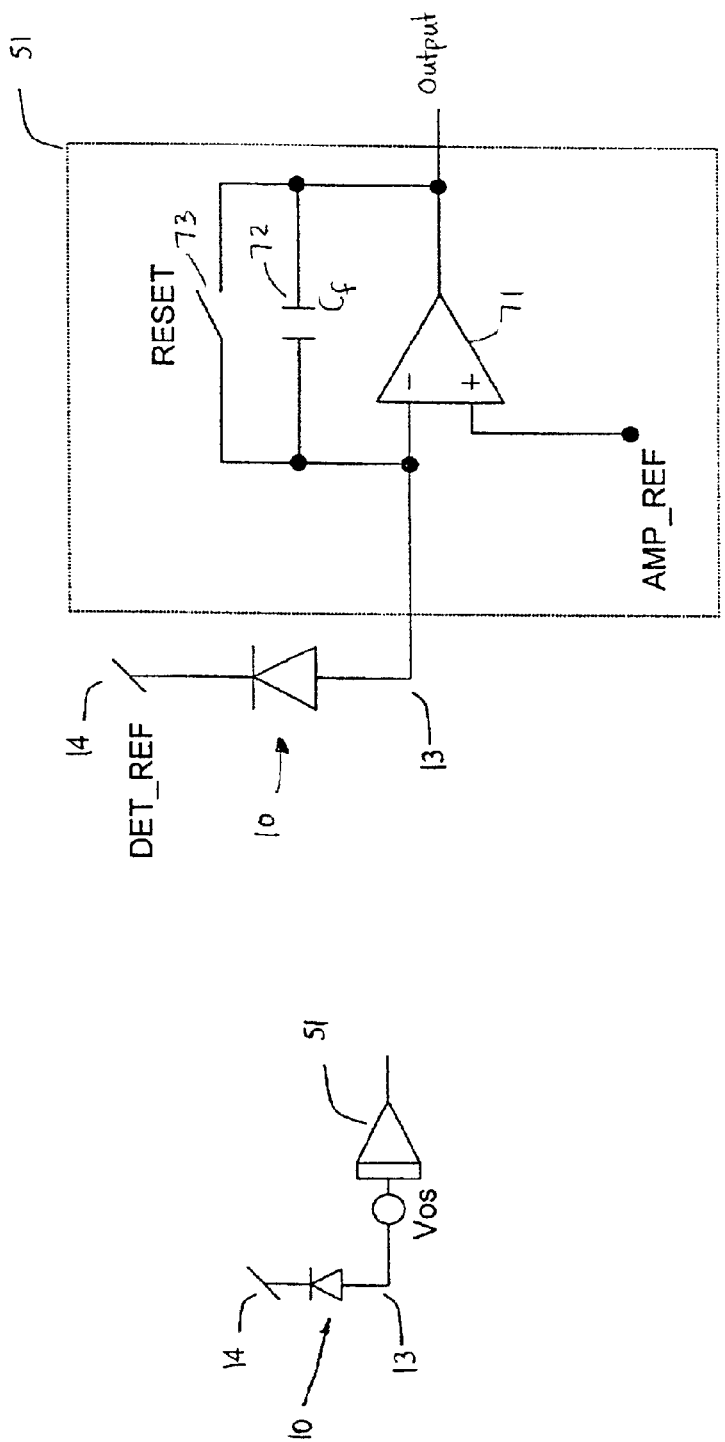
FIG. 7A is a circuit diagram of one integrating amplifier coupled to one detector element.
FIG. 7B is a circuit diagram of an integrating amplifier implemented as a differential amplifier in a reset integrator configuration.
Figure 8:
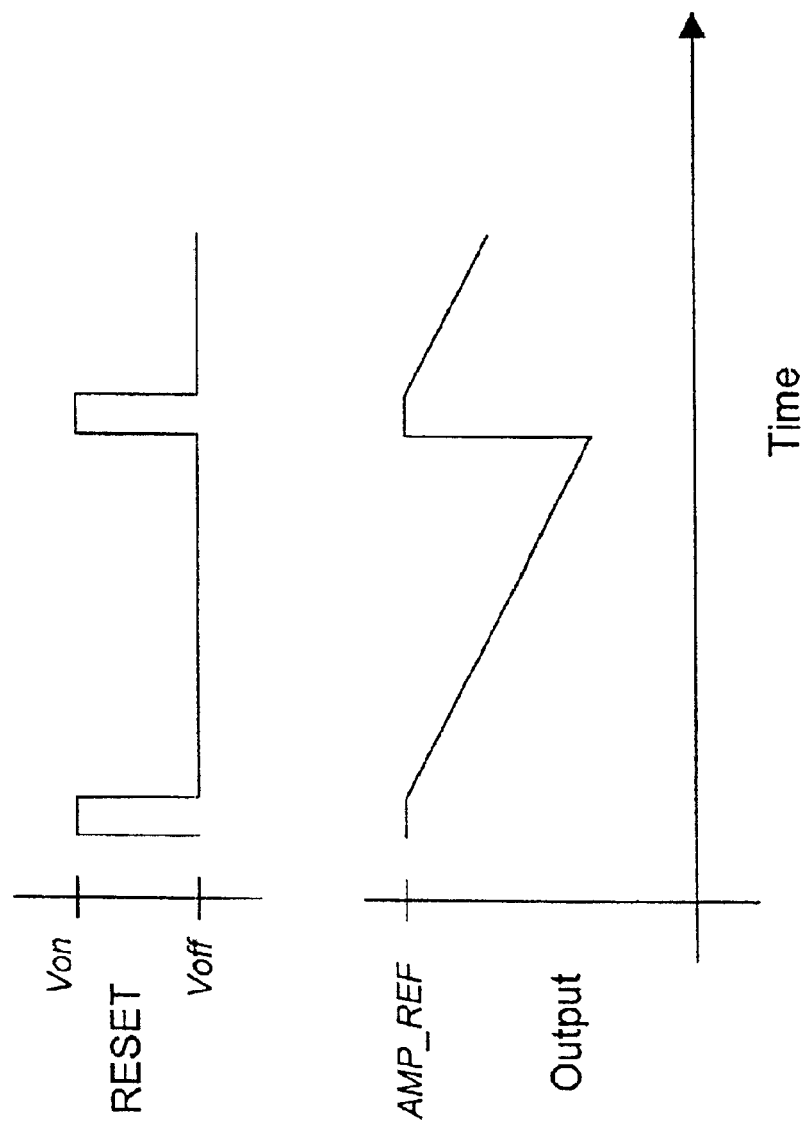
FIG. 8 is a timing diagram for the integrating amplifier of FIG. 7B.
Figure 9:
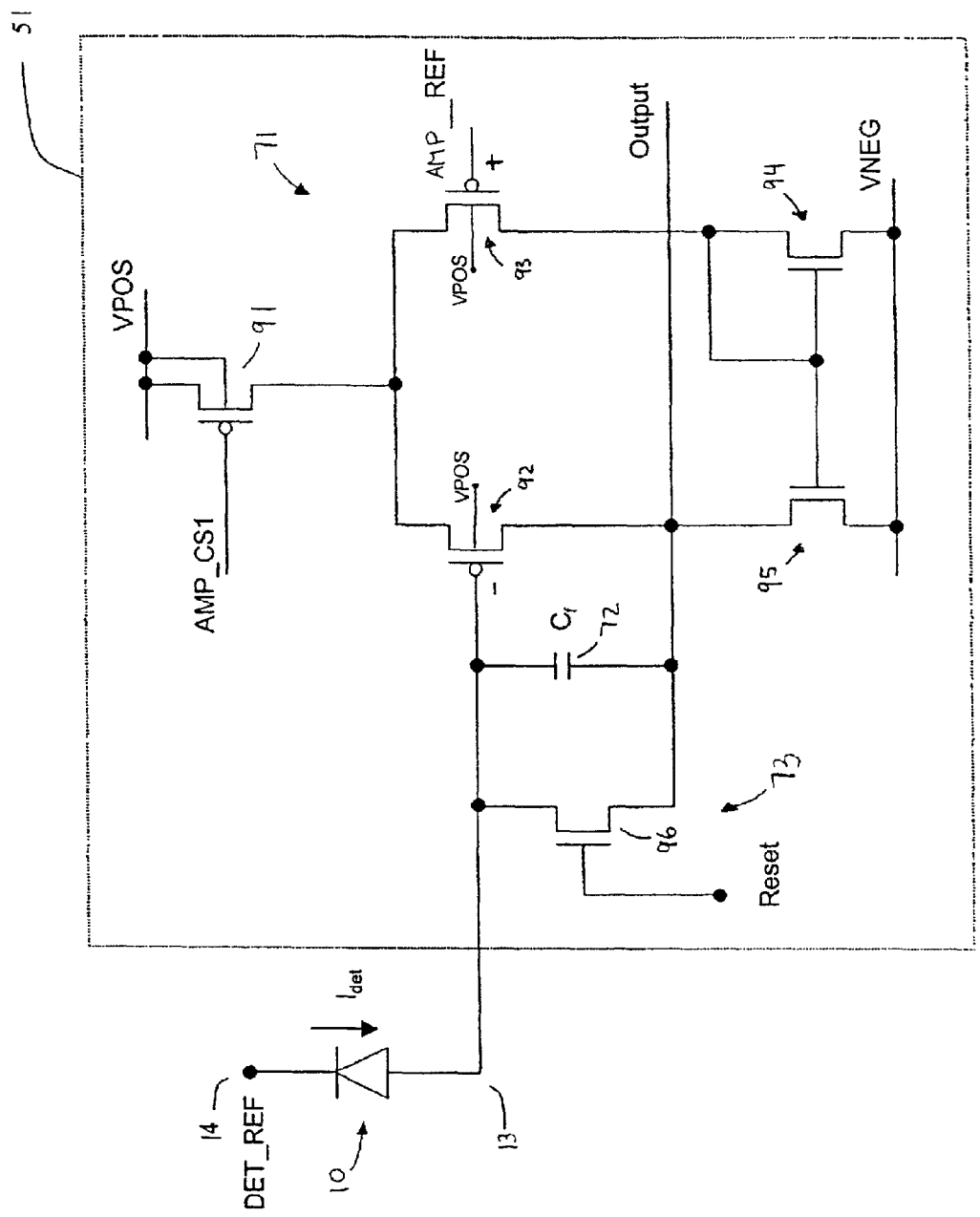
FIG. 9 is a circuit diagram of a CMOS embodiment of the integrating amplifier of FIG. 7B.
Figures 10A, 10B:
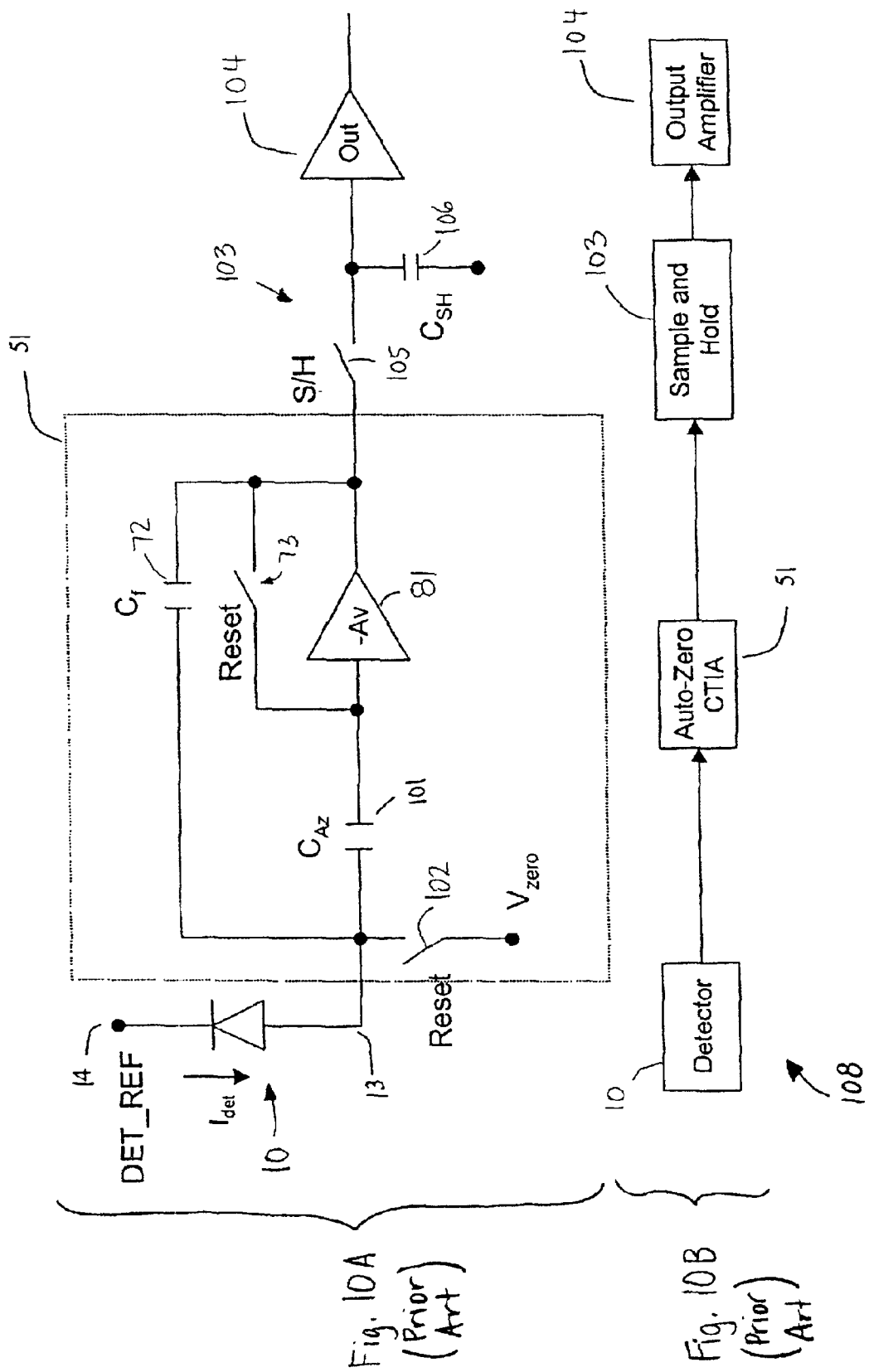
FIG. 10A is a circuit diagram including an alternative embodiment of the integrating amplifier of FIG. 7A.
FIG. 10B is a block diagram of the circuit diagram of FIG. 10A.

In some embodiments of the present invention, the two-stage auto-zero amplifier can be integrated into the electronics signal chains of FIG. 7B or FIG. 10B. For example, the two-stage auto-zero amplifier could replace integrating amplifiers 51 in FIG. 7B or FIG. 10B.

Figure 11:
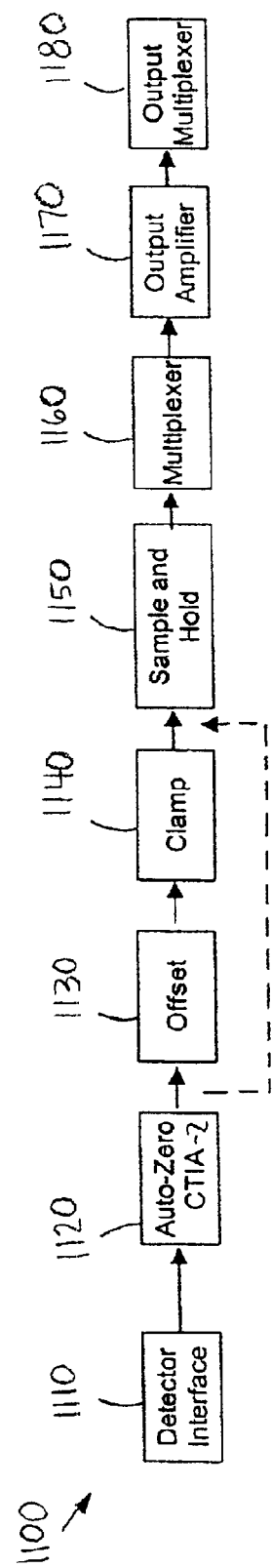
FIG. 11 is a block diagram of an electronics signal chain in accordance with one embodiment of the present invention.

FIG. 11 is a block diagram of an electronics signal chain 1100 in accordance with one embodiment of the present invention. Signal chain 1100 includes, serially-coupled, a detector interface 1110, a two-stage auto-zero amplifier 1120, an offset stage 1130, a clamp stage 1140, a sample and hold stage 1150, a multiplexer 1160, an output amplifier 1170, and an output multiplexer 1180. A signal path may also be provided between the output of auto-zero amplifier 1120 and sample and hold stage 1150, making clamp stage 1140 and sample and hold stage 1150 (which may be a correlated double sampling stage) optional.

Figure 12:
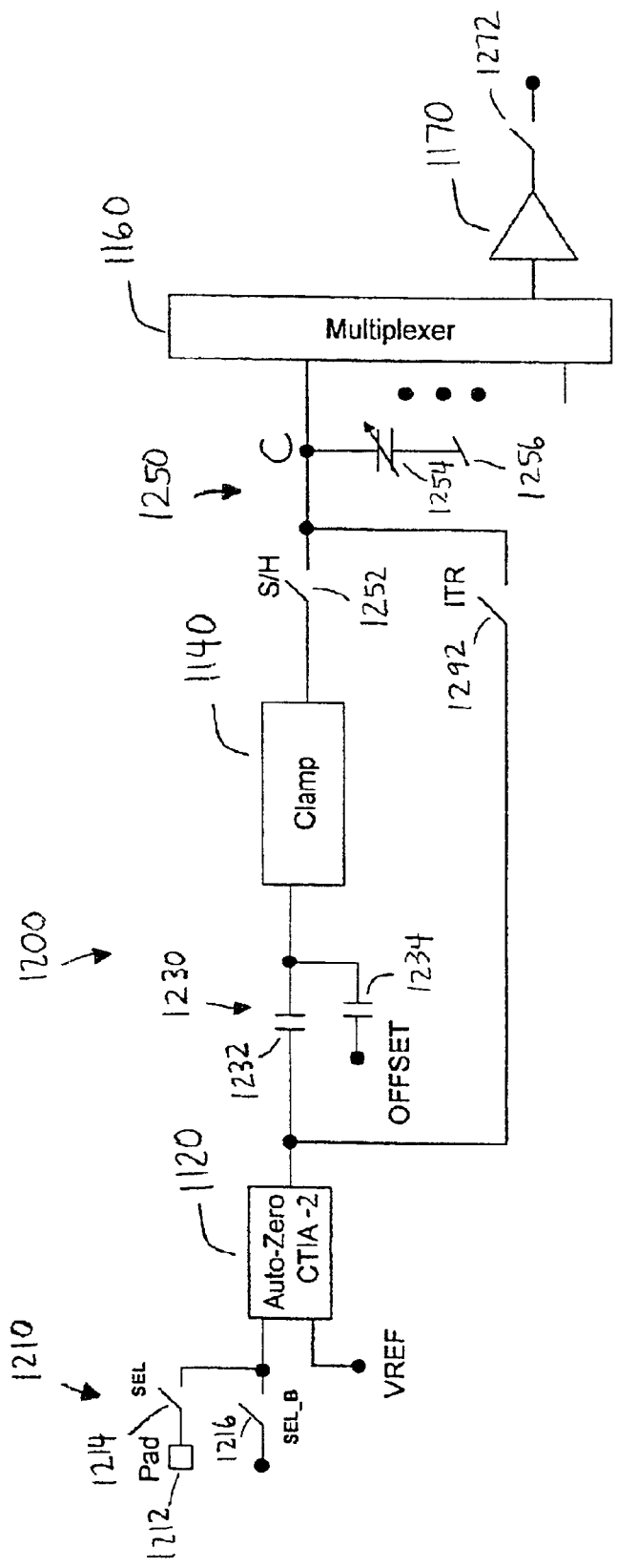
FIG. 12 is a detailed block diagram of an electronics signal chain in accordance with one embodiment of the present invention.

FIG. 12 is a detailed block diagram of an electronics signal chain 1200 in accordance with one embodiment of the present invention. A detector interface 1210 includes two (in this embodiment) coupling methods, one of which is used to couple to a detector element (not shown), such as detector element 10 of FIG. 1A. One coupling method includes a pad 1212, which allows wire bonding of a detector element to signal chain 1200. The second coupling method may include a bump bond, or other coupler. Two switches 1214 and 1216 are coupled, respectively, between the two coupling methods and one input of two-stage auto-zero amplifier 1120. Switches 1214 and 1216, respectively controlled by signals SEL and SEL_B (i.e., SEL bar, the inverse of SEL), are used to select the coupling method to which the detector element is coupled. A second input of two-stage auto-zero amplifier 1120 is coupled to receive a reference voltage VREF.

An offset stage 1230 includes a capacitor 1232 coupled between two-stage autos zero amplifier 1120 and clamp stage 1140, and a capacitor 1234 coupled between an offset reference voltage (OFFSET) and clamp stage 1140. Offset stage 1230 can shift the output signal level from auto-zero amplifier 1120, allowing subtraction of fixed offset levels from the output signal. Clamp stage 1140 performs a correlated double sampling function and is used to remove equa-partition noise (hereinafter referred to as KTC noise) introduced by auto-zero amplifier 1120.

The electrical signal from the detector element is passed from clamp stage 1140 to a sample and hold stage 1250. Sample and hold stage 1250 includes a switch 1252, controlled by a signal SH, coupled between the output of clamp stage 1140 and one terminal (labeled C) of a variable capacitor 1254. The other terminal of capacitor 1254 is coupled to a ground terminal or a reference voltage 1256. The output (node C) of sample and hold stage 1250 is coupled to one input of multiplexer 1160. The other inputs of multiplexer 1160 are coupled to other electronics signal chains 1200 for other detector elements in the detector array. The output of multiplexer 1160 is coupled to the input of output amplifier 1170. A switch 1272 is coupled between the output of output amplifier 1170 and the output of the sensor.

Passing the electrical signal from the detector element (not shown) through offset stage 1230 and clamp stage 1140 is advantageous when the KTC noise introduced by auto-zero amplifier 1120 represents a significant contribution to the overall noise in the system. This is often the case for the high gain settings for auto-zero amplifier 1120. For the low gain settings, the KTC noise from auto-zero amplifier 1120 is not a significant component of the overall noise. For this case, signal chain 1200 includes a path to bypass offset stage 1230 and clamp stage 1140 through a switch 1292, controlled by a signal ITR. This couples the output signal from two-stage auto-zero amplifier 1120 directly to sample and hold stage 1250, allowing capacitor 1254 to further optimize the noise bandwidth for two-stage auto-zero amplifier 1120.

Figure 1B:
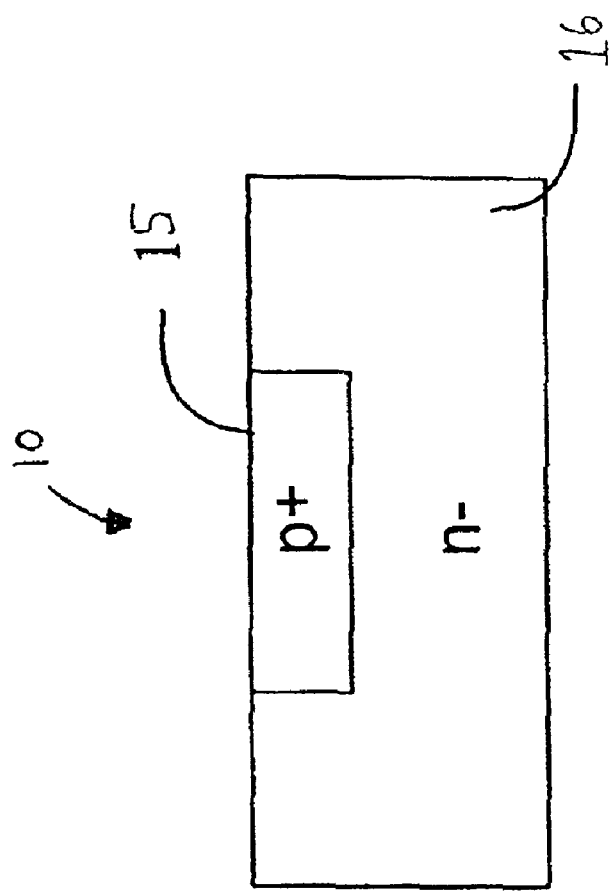
FIG. 1B is a cross-sectional side view of a typical pn junction photovoltaic detector element.
Figure 1A:
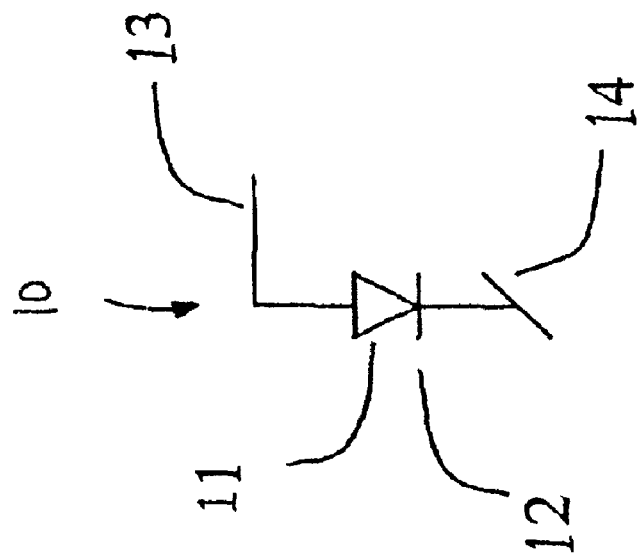
FIG. 1A is a circuit diagram of a typical pn junction photovoltaic detector element.
Figure 13:
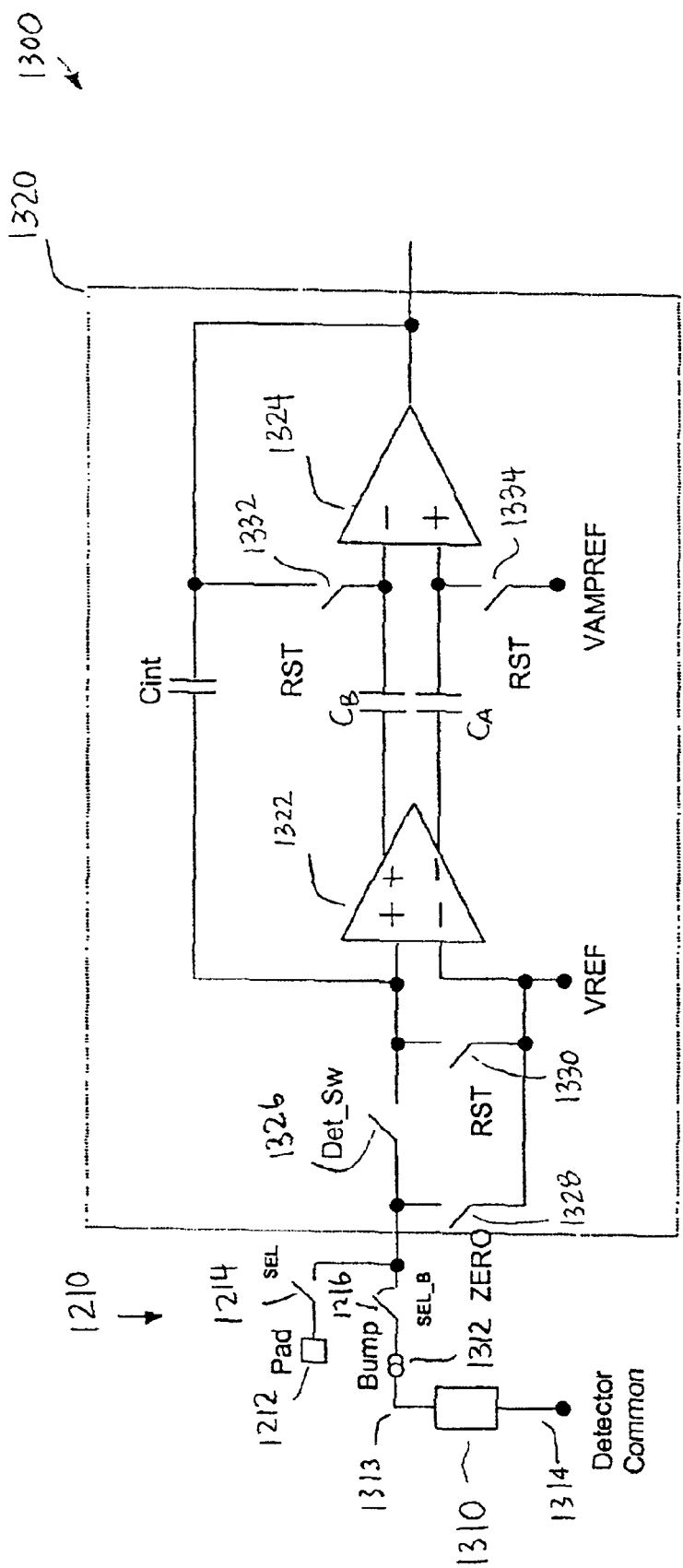
FIG. 13 is a circuit diagram of an electronics signal chain portion including an embodiment of a two-stage auto-zero amplifier in accordance with the present invention.

FIG. 13 is a circuit diagram of an electronics signal chain portion 1300 including an embodiment of a two-stage auto-zero amplifier 1320 in accordance with the present invention. A detector element 1310, which may be a photodiode similar to detector element 10 of FIG. 1A, is coupled to detector interface 1210 of signal chain portion 1300. Detector interface 1210 includes a bump bond 1312 as the second coupling method. Bump bond 1312 is a metallurgical interconnect, which provides both mechanical and electrical coupling. A terminal 1313 of detector element 1310 is coupled to bump bond 1312, and a terminal 1314 of detector element 1310 is coupled to a detector common reference voltage.

Conventional implementations use a single amplifier to implement integrating amplifier 51 (e.g., differential amplifier 71 of FIG. 7B or inverting amplifier 81 of FIG. 10A). Two-stage auto-zero amplifier 1320 in electronics signal chain portion 1300, however, includes a low noise, fixed gain amplifier 1322 that is capacitively coupled to a high gain amplifier 1324. Fixed gain amplifier 1322 serves as the first stage of auto-zero amplifier 1320, and high gain amplifier 1324 serves as the second stage of auto-zero amplifier 1320. The first stage (amplified) amplifier input offset voltage (also called the auto-zero voltage) is stored differentially across a coupling capacitor $C_A$ and a coupling capacitor $C_B$. Capacitor $C_A$ is coupled between the inverting output (−) of fixed gain amplifier 1322 and the non-inverting input (+) of high gain amplifier 1324. Capacitor $C_B$ is coupled between the non-inverting output (+) of fixed gain amplifier 1322 and the inverting input (−) of high gain amplifier 1324.

During operation (i.e., detection of the current flowing in detector element 1310), a switch 1326, controlled by a signal Det_Sw, is closed to couple detector element 1310, through detector interface 1210, to the non-inverting input (+) of fixed gain amplifier 1322. The inverting input (−) of fixed gain amplifier 1322 is coupled to receive voltage reference VREF. An integrating feedback capacitor Cint is coupled between the non-inverting input (+) of fixed gain amplifier 1322 and the output of high gain amplifier 1324, which is also the output of two-stage auto-zero amplifier 1320.

To auto-zero and reset two-stage auto-zero amplifier 1320, switch 1326 is opened to decouple detector element 1310 from auto-zero amplifier 1320. A switch 1328, controlled by a signal ZERO, is closed to couple the input of auto-zero amplifier 1320 (i.e., the output of detector interface 1210) to voltage reference VREF. A switch 1330, controlled by a signal RST, is closed to couple the non-inverting input (+) of fixed gain amplifier 1322 to reference voltage VREF (and to the inverting input (−) of fixed gain amplifier 1322). A switch 1332, also controlled by signal RST, is closed to couple the inverting input (−) of high gain amplifier 1324 to the output of high gain amplifier 1324. A switch 1334, also controlled by signal RST, is closed to couple the non-inverting input (+) of high gain amplifier 1324 to a reference voltage VAMPREF.

In signal chain portion 1300, the output of two-stage auto-zero amplifier 1320 may interface with the signal chain in a variety of ways. As seen in FIG. 11, the output of two-stage auto-zero amplifier 1320 may be coupled to offset stage 1130 and clamp stage 1140, or offset stage 1130 and clamp stage 1140 may be bypassed and the output of auto-zero amplifier 1320 may be coupled to sample and hold stage 1150. As discussed with reference to FIG. 12, clamp stage 1140 may include a correlated double sampler for KTC noise removal under high trans-impedance conditions. Under low trans-impedance conditions, offset stage 1230 and clamp stage 1140 may be bypassed, and the output of two-stage auto-zero amplifier 1320 may be coupled to sample and hold stage 1250.

Figure 14:
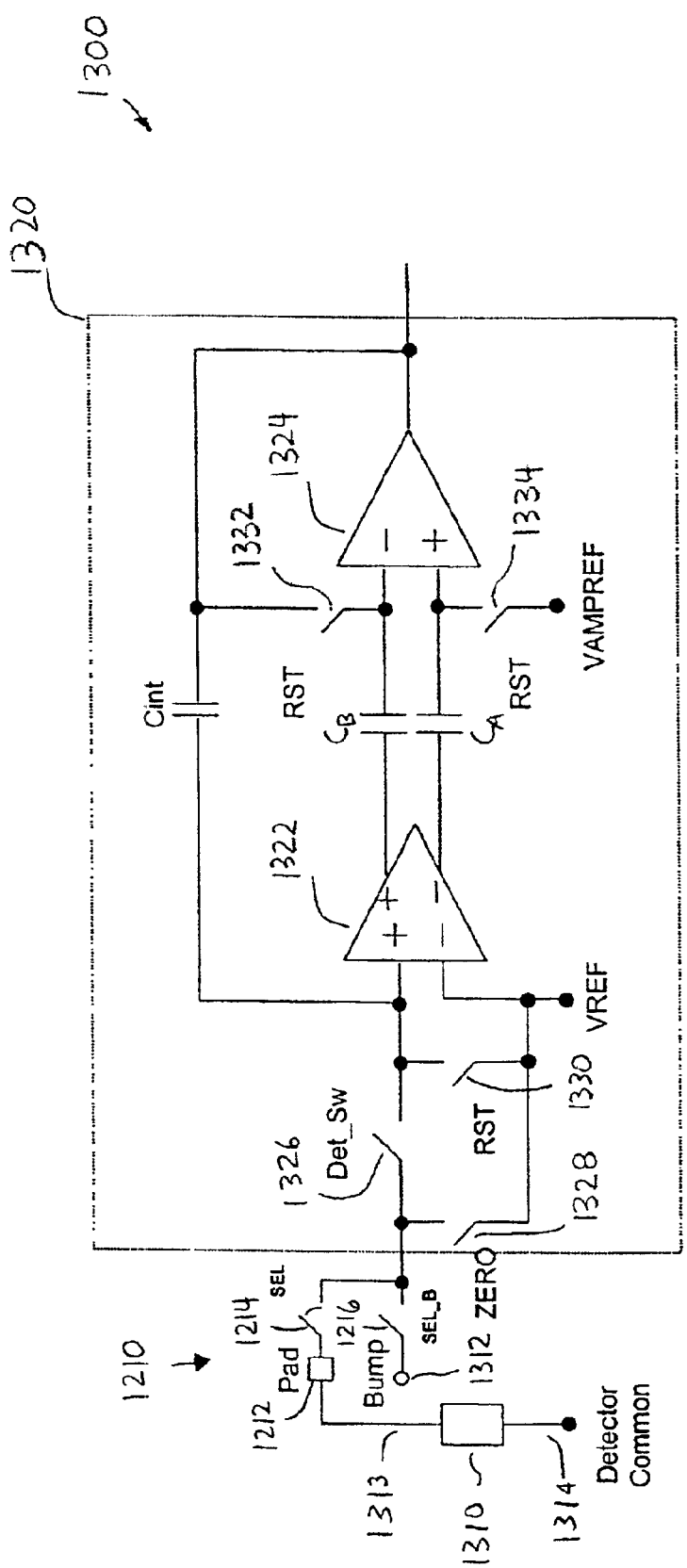
FIG. 14 is a circuit diagram of the electronics signal chain portion of FIG. 13 showing an alternative coupling to the detector element.

FIG. 14 is a circuit diagram of electronics signal chain portion 1300 of FIG. 13 showing an alternative coupling to detector element 1310. In FIG. 14, terminal 1313 of detector element 1310 is coupled (e.g., by wire bonding) to pad 1212 of detector interface 1210. As discussed above with reference to FIG. 12, switches 1214 and 1216, respectively controlled by signals SEL and SEL_B, are used to select the coupling method to which detector element 1310 is coupled.

The biasing schemes illustrated in FIG. 13 and FIG. 14 rely on two biases to set the bias of detector element 1310. The two biases include the detector common reference voltage (applied to terminal 1314 of detector element 1310) and the reference voltage VREF (applied to the inverting input of fixed gain amplifier 1322 of auto-zero amplifier 1320). These two biases may be supplied by the same voltage source. In the signal chain portion 1300 of a particular detector element 1310 of a large array, however, the actual voltages applied to terminal 1314 of element 1310 and to the inverting input (−) of fixed gain amplifier 1322 may differ. To first order, the difference between these two potentials is the bias condition of detector element 1310.

Figure 2B:
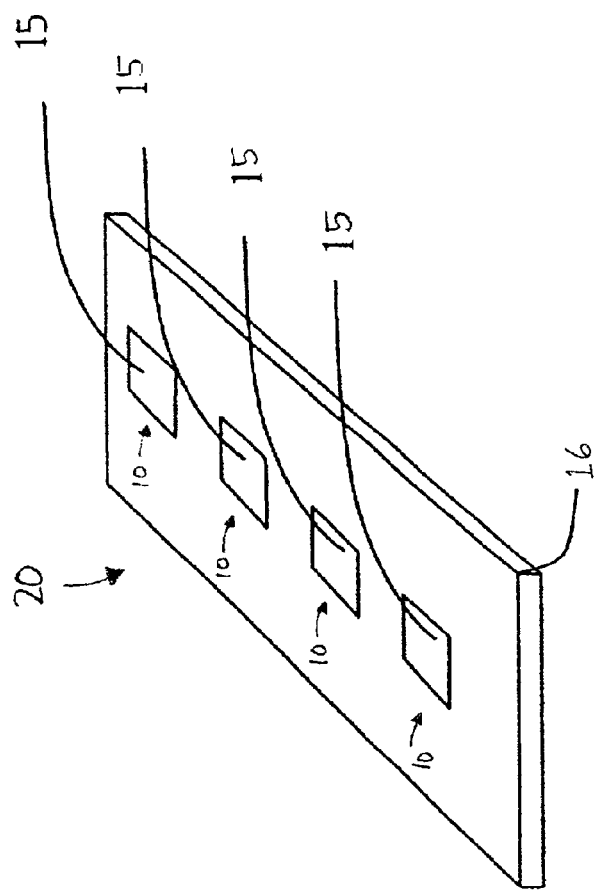
FIG. 2B is a perspective view of a typical pn junction photovoltaic detector array.
Figure 2A:
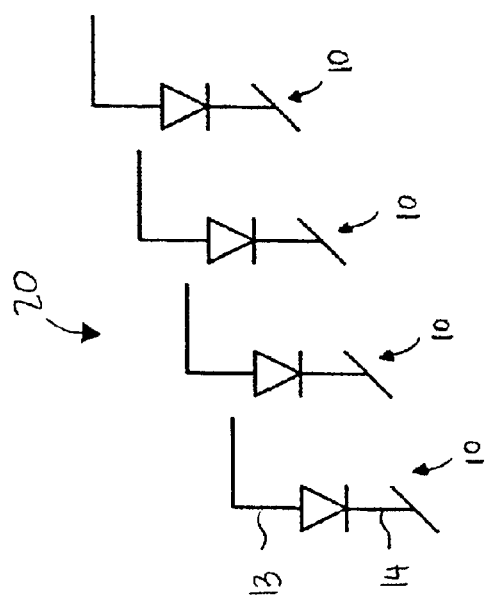
FIG. 2A is a circuit diagram of a typical pn junction photovoltaic detector array.
Figure 3:
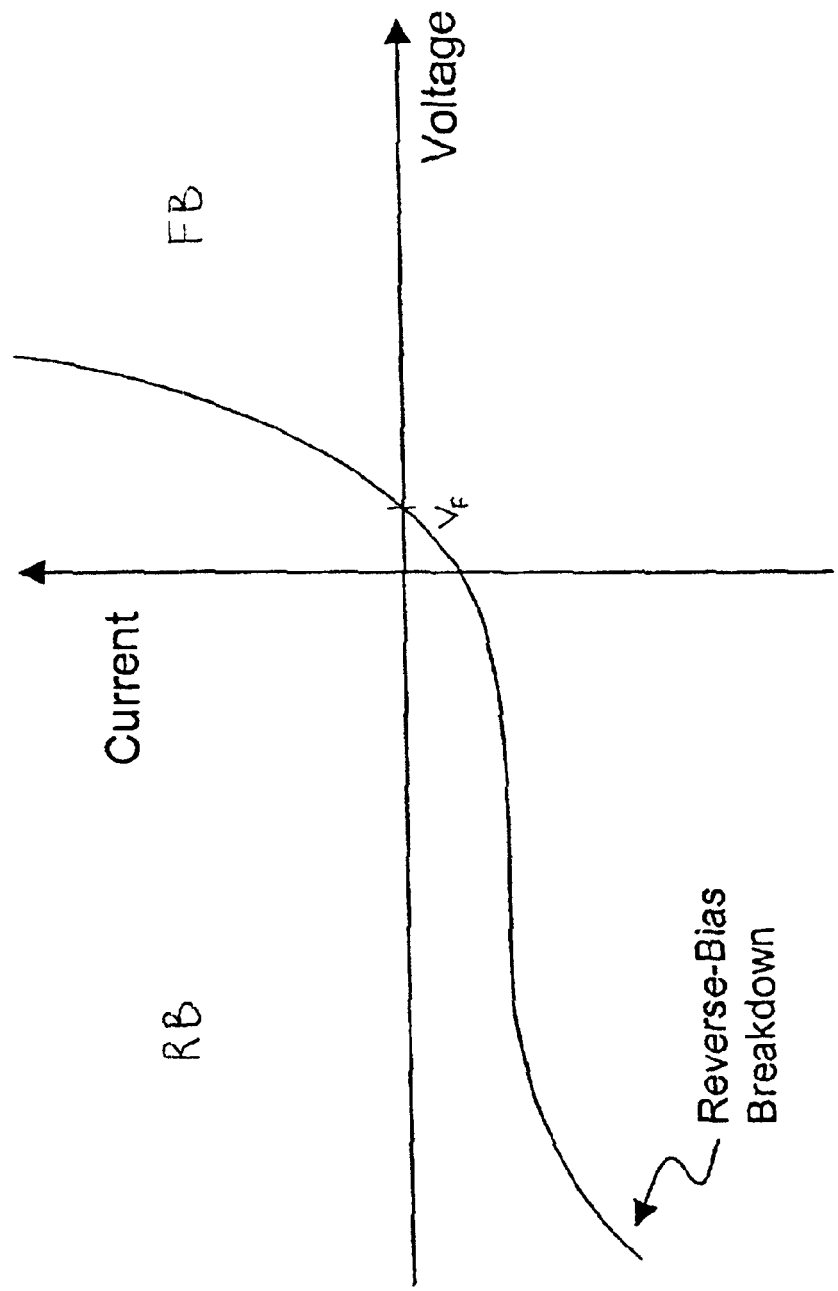
FIG. 3 is a graphical illustration of a current-voltage (IV) characteristic for the pn junction photovoltaic detector element of FIG. 1A under illumination.
Figure 4:
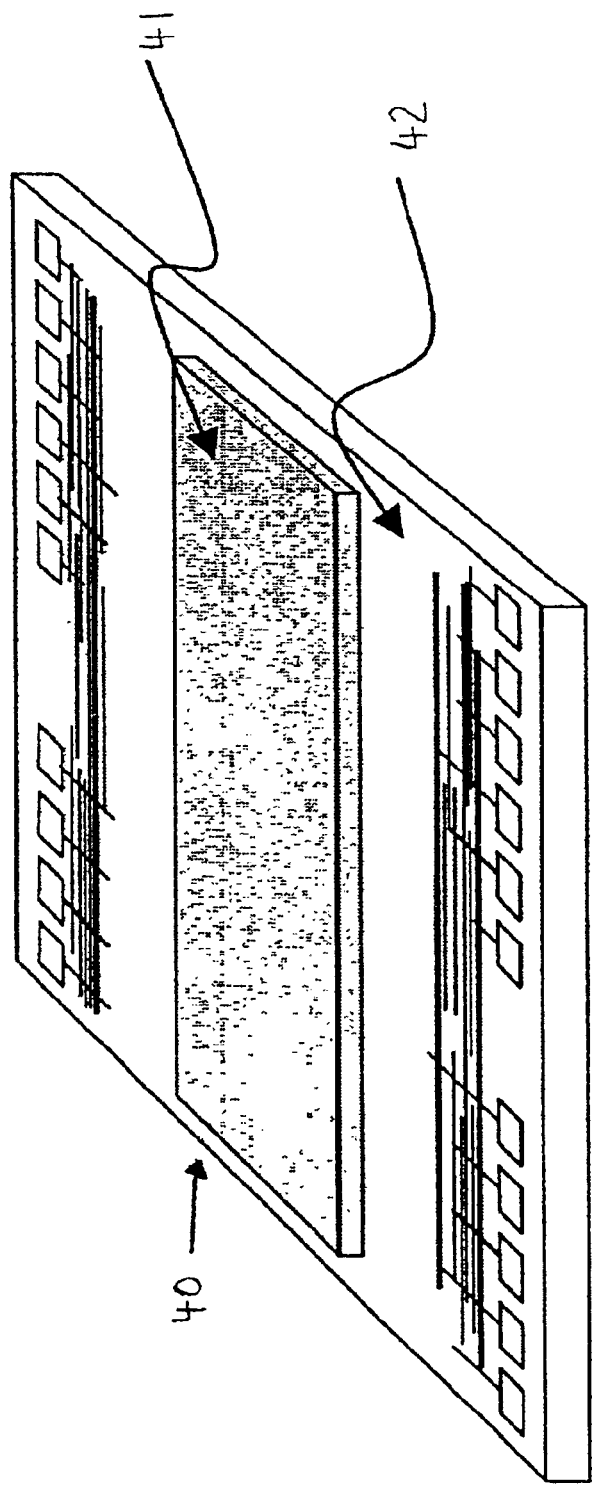
FIG. 4 is a perspective illustration of an electro-optical sensor including a detector in close proximity to an integrated circuit readout multiplexer.
Figure 5:
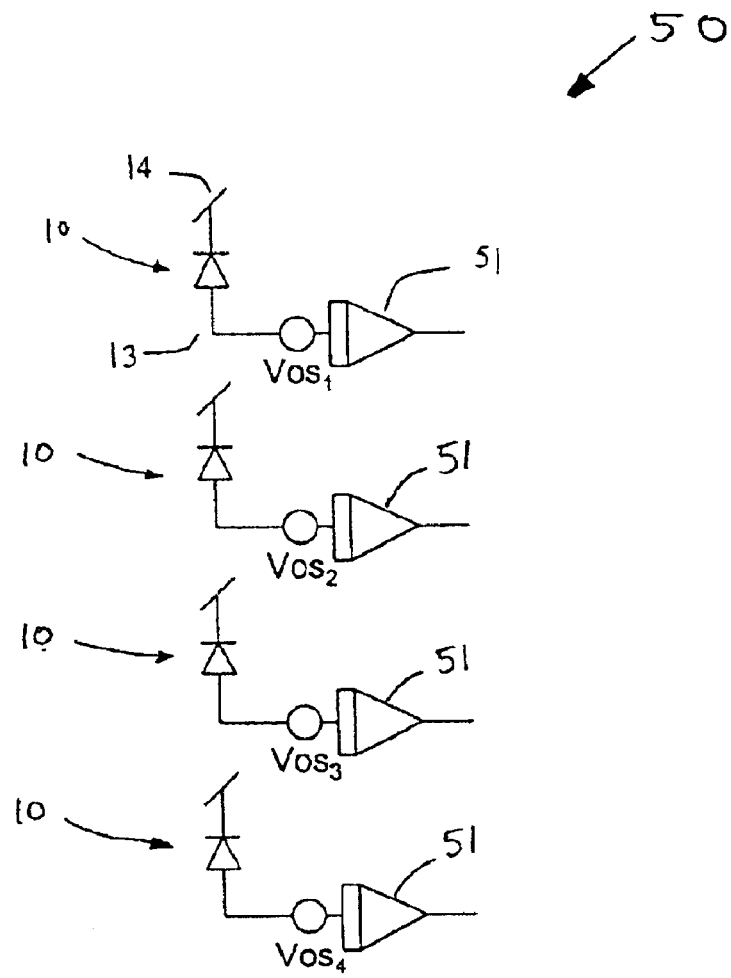
FIG. 5 is a circuit diagram of an array of four detector elements each coupled to an integrating amplifier.
Figure 6A:
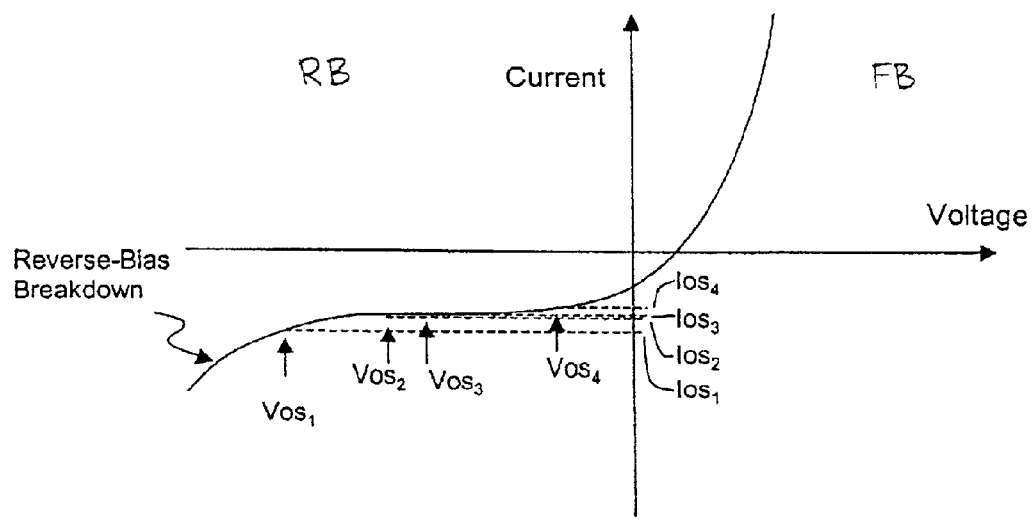
FIG. 6A is a graphical illustration of a current-voltage (IV) characteristic for the array of FIG. 5, for a large input offset voltage distribution.
Figure 6B:
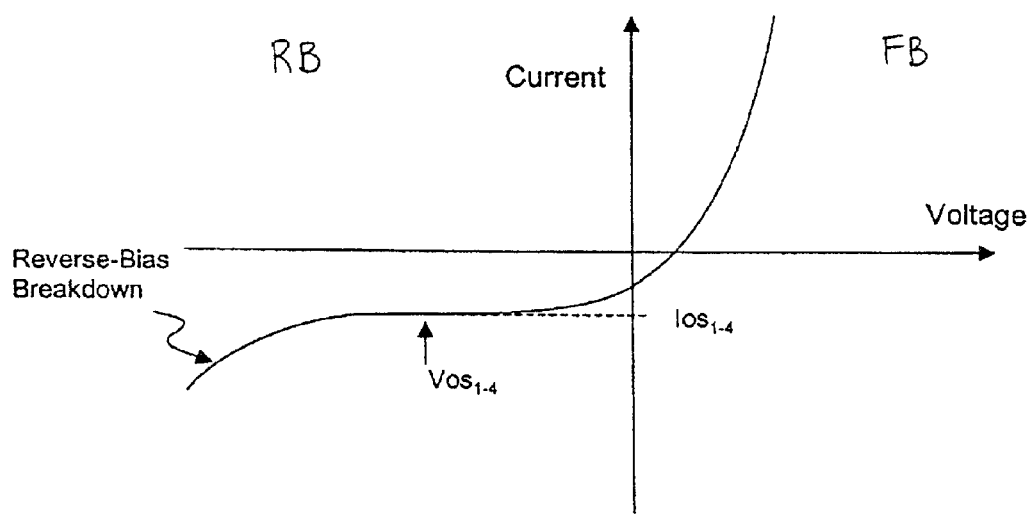
FIG. 6B is a graphical illustration of a current-voltage (IV) characteristic for the array of FIG. 5, for a very low input offset voltage distribution.

The voltage difference between the detector common reference voltage and reference voltage VREF arises from the nature of the fabricated detector array. As shown, for example, in FIGS. 2A and 2B, terminal 14 (the detector common terminal formed by semiconductor 16 in FIG. 2B) is shared by all detector elements 10 in an array, while terminals 13 are unique to each detector element 10. A current generated in a particular detector element 10 is returned through terminal 14 to the detector common voltage source, causing a voltage drop through the substrate (i.e., semiconductor 16) in which the elements are fabricated. Since detector elements 10 cannot be electrically isolated from each other because they are made in a single substrate, this results in a global voltage drop that is seen by all detector elements 10 in the array.

Under some biasing conditions (e.g., in the 50 mV range), the voltage drop may not be significant. In the $\mu$V regime, however, the voltage drop may become significant, causing a shift in the level of the detector common reference voltage, as applied at terminals 1314 of detector elements 1310 of FIG. 13 or FIG. 14. The difference between the detector common reference voltage (applied to terminal 1314) and reference voltage VREF (applied to the inverting input of fixed gain amplifier 1322) makes zero-biasing of detector element 1310 difficult. This limits the ability to provide stable biasing of each of the auto-zero amplifiers 1320 in each of the signal chain portions 1300 in the array.

Figure 15:
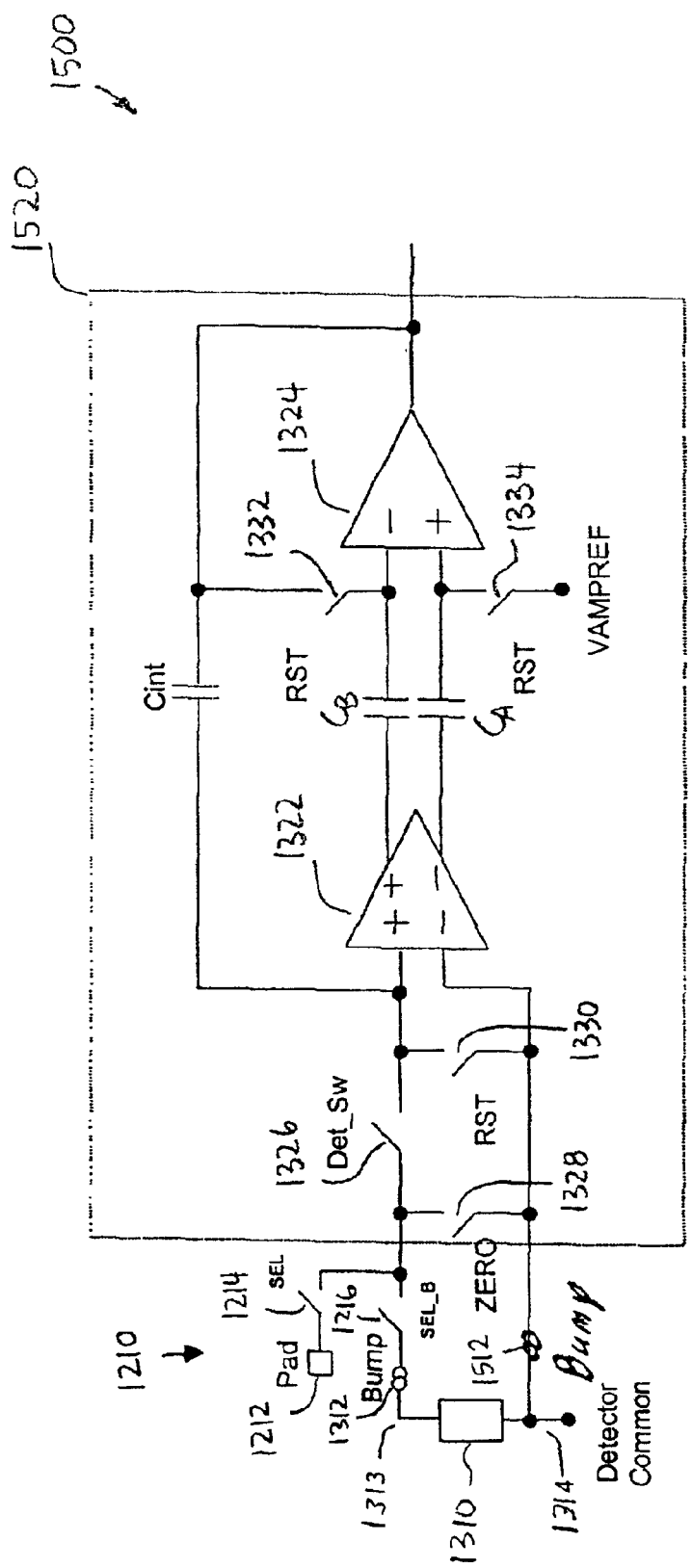
FIG. 15 is a circuit diagram of an electronics signal chain portion including an embodiment of a two-stage auto-zero amplifier, with an alternative biasing scheme, in accordance with the present invention.

FIG. 15 is a circuit diagram of an electronics signal chain portion 1500 including an embodiment of a two-stage auto-zero amplifier 1520, with an alternative biasing scheme, in accordance with the present invention. Signal chain portion 1500 of FIG. 15 is similar to signal chain portion 1300 of FIG. 13. Accordingly, the discussion will focus on differences between signal chain portion 1500 and signal chain portion 1300.

In signal chain portion 1500 of FIG. 15, switches 1328 and 1330 are still coupled respectively between the two terminals of switch 1326 and the inverting input (−) of fixed gain amplifier 1322. The inverting input (−) of fixed gain amplifier 1322 in signal chain portion 1500, however, is no longer coupled to reference voltage VREF as in signal chain portion 1300 of FIG. 13. Instead, the inverting input (−) of fixed gain amplifier 1322 is coupled to terminal 1314 of detector element 1310, thereby locally referencing fixed gain amplifier 1322 to the respective detector element 1310 coupled to a particular signal chain portion 1500. The local referencing is accomplished by a bump bond 1512, which electrically connects the inverting input (−) of fixed gain amplifier 1322 to the substrate (i.e., semiconductor 16 of FIG. 2B, which forms terminal 1314 of FIG. 15) spatially close to the active region of the respective detector element 1310. Terminal 1314 of detector element 1310 is coupled, as in signal chain portion 1300 of FIG. 13, to the detector common reference voltage. Thus, the inverting input (−) of fixed gain amplifier 1322 shifts with any induced voltage drop of the detector common reference voltage, facilitating zero-biasing of auto-zero amplifier 1520.

In FIG. 15, the local reference is accomplished using bump bond 1512. It is possible, however, to electrically couple the inverting input (−) of fixed gain amplifier 1322 to the substrate (i.e., semiconductor 16 in FIG. 2B, which forms terminal 1314 of FIG. 15) using another method, for example, a wire bond coupled to a bond pad.

The biasing scheme illustrated in signal chain portion 1500 of FIG. 15 is useful for low- or zero-bias detector configurations. A single bias voltage, the detector common reference voltage, is used as both the detector common bias and the reference bias for two-stage auto-zero amplifier 1520. Advantageously, this reduces the common mode noise or sensitivity between the common node (terminal 1314) of detector element 1310 and the reference bias of fixed gain amplifier 1322. It also reduces the cross-talk between detector elements 10, especially when one pixel (e.g., one detector element 10) is saturated and a neighboring pixels is not.

Additionally, this configuration allows the use of switch 1328, controlled by signal ZERO, to shunt current from detector element 1310. This function may be useful to shunt the current from any defective detector elements 1310 or to selectively shunt current from specific detector elements 1310. Shunting current from specific detector elements 1310 can allow operation of the electro-optical sensor in extremely high dynamic range environments where some of the pixels may become saturated, while neighboring pixels may contain signal information. Under saturation conditions, a saturated pixel causes a large current to flow in the detector element 1310. Excess current from the detector element 1310 can flow to neighboring detector elements 1310 corrupting the signal levels corresponding to their respective pixels. Current shunting of selective detector elements 1310 can greatly suppress this problem.

Figure 16:
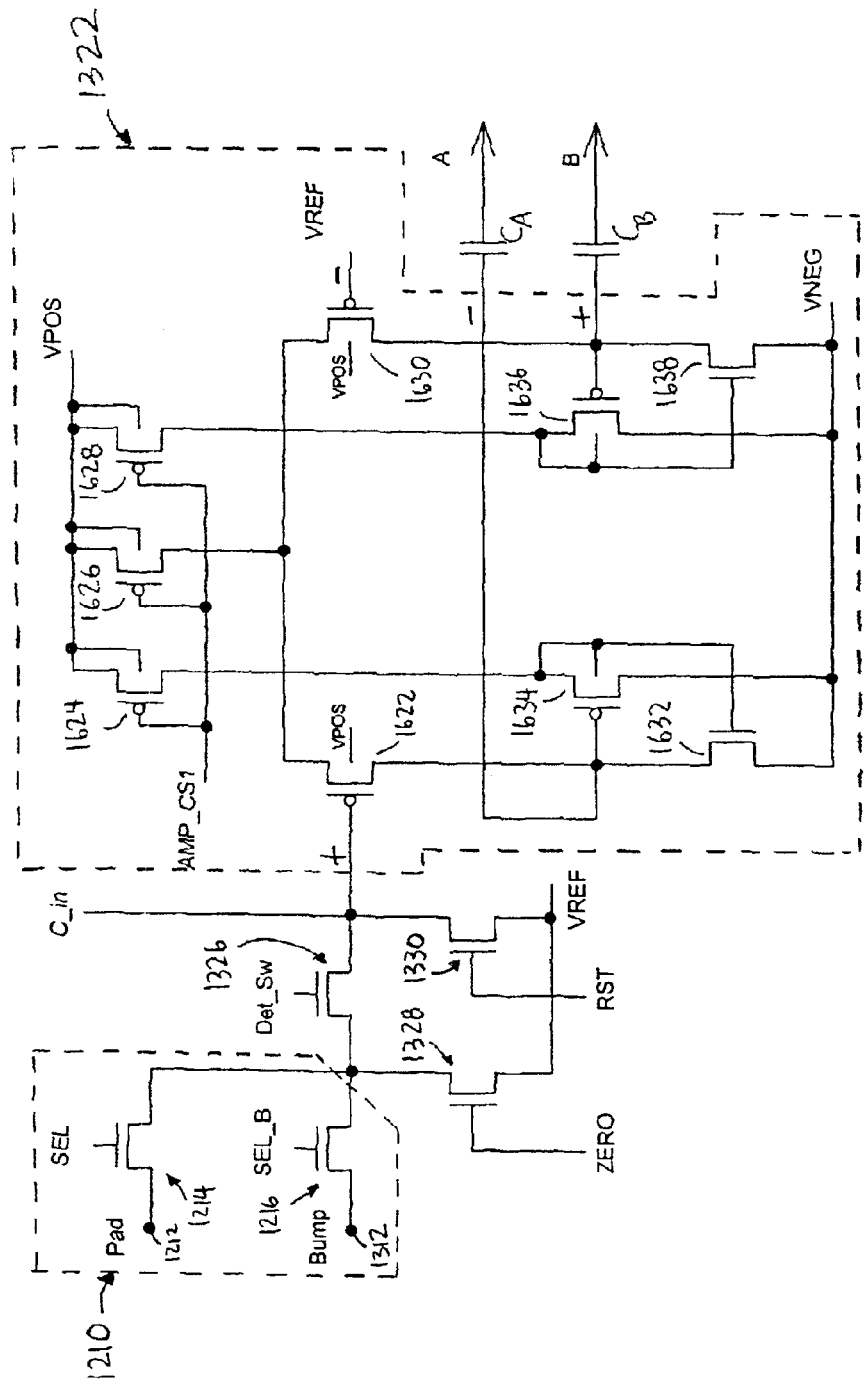
FIG. 16 is a circuit diagram of a CMOS embodiment of the detector interface, the switch network, the fixed gain amplifier, and coupling capacitors $C_A$ and $C_B$ of the two-stage auto-zero amplifier of FIG. 13.

FIG. 16 is a circuit diagram of a CMOS embodiment of detector interface 1210, the switch network, fixed gain amplifier 1322 (i.e., the few stage of auto-zero amplifier 1320), and coupling capacitors $C_A$ and $C_B$ of two-stage auto-zero amplifier 1320 of FIG. 13. In detector interface 1210, switch 1214 is implemented as an n-type MOSFFT, including a gate terminal controlled by signal SEL and drain and source terminals coupled between pad 1212 and the output of detector interface 1210. Switch 1216 is implemented as an n-type MOSFET, including a gate terminal controlled by signal SEL_B and drain and source terminals coupled between bump 1312 and the output of detector interface 1210. As discussed above, switches 1214 and 1216, respectively controlled by complementary signals SEL and SEL_B, control the selection of either a wire-bonded or bump-bonded detector element (not shown). Since SEL and SEL_B are complementary signals, only one of the MOSFETs of switches 1214 and 1216 is on at a time to allow coupling of a detector element to auto-zero amplifier 1320 of FIG. 13.

In the embodiment of FIG. 16, switches 1326, 1328, and 1330 are each implemented as n-type MOSFETs, including gate terminals respectively controlled by signals Det_Sw, ZERO, and RST. The drain and source terminals of switch 1326 are coupled between the output of detector interface 1210 and the gate terminal of a p-type MOSFET 1622. The drain and source terminals of switch 1328 are coupled between the output of detector interface 1210 and reference voltage VREF, while the drain and source terminals of switch 1330 are coupled between the gate of MOSFET 1622 and reference voltage VREF. Also shown in FIG. 16 coupled to the gate of MOSFET 1622 is a lead (labeled C_in), which leads to integrating feedback capacitor Cint of FIG. 13.

In the embodiment of FIG. 16, low noise, fixed gain amplifier 1322 is implemented as a differential amplifier with differential inputs and differential outputs. A plurality (three in this embodiment) of p-type MOSFETs 1624, 1626, and 1628 act as current sources for biasing fixed gain amplifier 1322. The sources and bodies of MOSFETs 1624, 1626, and 1628 are coupled to a reference voltage VPOS. The gates of MOSFETs 1624, 1626, and 1628 are coupled to receive a biasing signal AMP_CS1.

The drain of MOSFET 1626 (i.e., one of the current sources) is coupled to the sources of p-type MOSFET 1622 and a p-type MOSFET 1630. MOSFETs 1622 and 1630 form a common source pair for fixed gain amplifier 1322, with their gates providing the differential inputs to fixed gain amplifier 1322. The gate of MOSFET 1622, which is the non-inverting input (+) of fixed gain amplifier 1322 (FIG. 13), is coupled through switch 1326 to detector interface 1210. The gate of MOSFET 1630, which is the inverting input (−) of fixed gain amplifier 1322 (FIG. 13), is coupled to reference voltage VREF. The bodies of MOSFETs 1622 and 1630 are coupled to VPOS.

An n-type MOSFET 1632, a p-type MOSFET 1634, a p-type MOSFET 1636, and an n-type MOSFET 1638 serve as loads in fixed gain amplifier 1322. The sources and bodies of MOSFETs 1632 and 1638, and the drains of MOSFETs 1634 and 1636, are coupled to a reference voltage VNEG. The source and body of MOSFET 1634 are coupled to the drain of MOSFET 1624 (i.e., one of the current sources) and to the gate of MOSFET 1632. The source and body of MOSFET 1636 are coupled to the drain of MOSFET 1628 (i.e., one of the current sources) and to the gate of MOSFET 1638. This load configuration, to first order, looks resistive at small signal levels. MOSFETs 1634 and 1636 allow biasing of MOSFETs 1632 and 1638 for higher dynamic range operation.

The drain of MOSFET 1632, which is the inverting output (−) of fixed gain amplifier 1322, is coupled to the drain of MOSFET 1622, the gate of MOSFET 1634, and one terminal of coupling capacitor $C_A$. The drain of MOSFFT 1638, which is the non-inverting output (+) of fixed gain amplifier 1322, is coupled to the drain of MOSFET 1630, the gate of MOSFET 1636, and one terminal of coupling capacitor $C_B$. The other terminals of coupling capacitors $C_A$ and $C_B$, respectively labeled as terminals A and B, are coupled to the second stage of auto-zero amplifier 1320 of FIG. 13, as discussed with reference to FIG. 17 below.

In the embodiment of FIG. 16, the first stage (i.e., fixed gain amplifier 1322) of auto-zero amplifier 1320 of FIG. 13 is implemented as a fixed gain, open loop amplifier with a small signal gain in the range of five to twenty. In one embodiment, the gain of fixed gain amplifier 1322 might be thirteen. Fixed gain amplifier 1322 of FIG. 16 does not require a high degree of linearity. As long as the gain of fixed gain amplifier 1322 remains within its dynamic range, feedback from the second stage amplifier (i.e., high gain amplifier 1324 of FIG. 13) can correct for any first stage non-linearity.

The principal role of the first stage amplifier (fixed gain amplifier 1322) is to provide small signal differential amplification with low noise and wide bandwidth. The fixed gain of fixed gain amplifier 1322 increases the overall loop gain of auto-zero amplifier 1320 (FIG. 13) by the gain of fixed gain amplifier 1322. Additionally, since the differential coupling capacitors $C_A$ and $C_B$ are located after fixed gain amplifier 1322, the KTC noise from coupling capacitors $C_A$ and $C_B$ and any switch-induced voltage offsets are reduced by the gain of fixed gain amplifier 1322. From a noise perspective, this reduces the size requirements of coupling capacitors $C_A$ and $C_B$, which perform the auto-zero function in auto-zero amplifier 1320, and it reduces the input offset voltage error due to reset switching events. Practitioners skilled in the art will appreciate that alternative embodiments of low noise, fixed gain amplifier 1322 are possible.

Figure 17:
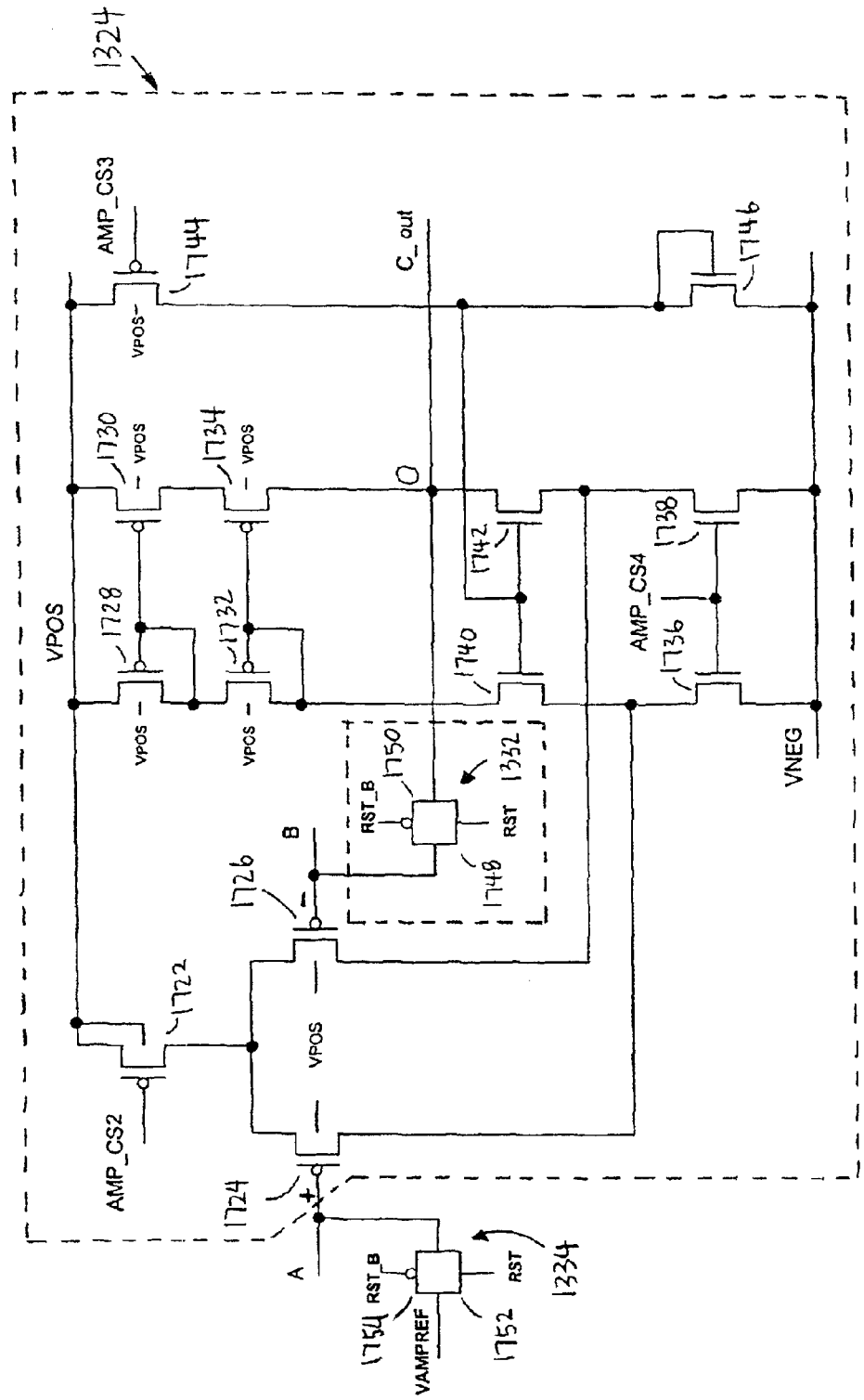
FIG. 17 is a circuit diagram of a CMOS embodiment of the high gain amplifier of the two-stage auto-zero amplifier of FIG. 13.

FIG. 17 is a circuit diagram of a CMOS embodiment of high gain amplifier 1324 (i.e., the second stage) of two-stage auto-zero amplifier 1320 of FIG. 13. High gain amplifier 1324 is implemented as a folded cascode amplifier to provide high gain and high output signal swing. The reference textbook entitled "CMOS Analog Circuit Design," by Phillip E. Allen and Douglas R. Holberg, published by Hold, Reinhart, and Winston, 1987, provides an excellent reference regarding CMOS differential amplifiers, such as the folded cascode amplifier used to implement high gain amplifier 1324.

In FIG. 17, the input stage of the folded cascode amplifier used to implement high gain amplifier 1324 includes a p-type MOSFET 1722 acting as a current source for a common source pair including a p-type MOSFET 1724 and a p-type MOSFET 1726. The source and body of MOSFET 1722 are coupled to reference voltage VPOS. The gate of MOSFET 1722 is coupled to receive a biasing signal AMP_CS2. The drain of MOSFET 1722 is coupled to the sources of MOSFETs 1724 and 1726. The gates of MOSFETs 1724 and 1726 provide the differential inputs to high gain amplifier 1324. The gate of MOSFET 1724, which is the non-inverting input (+) of high gain amplifier 1324, is coupled to terminal A of coupling capacitor $C_A$ from FIG. 16. The gate of MOSFET 1726, which is the inverting input (−) of high gain amplifier 1324, is coupled to terminal B of coupling capacitor $C_B$ from FIG. 16. The bodies of MOSFETs 1724 and 1726 are coupled to VPOS.

In FIG. 17, the biasing stage of the folded cascode amplifier used to implement high gain amplifier 1324 includes a plurality of p-type MOSFETs 1728, 1730, 1732, and 1734, coupled as shown, functioning as a cascode current mirror. N-type MOSFETs 1736 and 1738 function as current sources. The gates of MOSFETs 1736 and 1738 are coupled together and receive a biasing signal AMP_CS4. N-type MOSFETs 1740 and 1742 function as common gate amplifiers. The gates of MOSFETs 1740 and 1742 are coupled together and receive a biasing signal established by a p-type current source MOSFET 1744 and an n-type load MOSFET 1746. MOSFETs 1744 and 1746 are serially coupled between reference voltage VPOS (coupled to the source and body of MOSFET 1744) and reference voltage VNEG (coupled to the source and body of MOSFET 1746). The gate of MOSFET 1744 is coupled to receive a biasing signal AMP_CS3. The drains of MOSFETs 1744 and 1746 are coupled to each other and to the gates of MOSFETs 1740, 1742, and 1746, thereby biasing MOSFETs 1740 and 1742 for operation as the common gate transistors of the folded cascode amplifier used to implement high gain amplifier 1324.

The input stage of high gain amplifier 1324 is coupled to the biasing stage of high gain amplifier 1324 through the drains of MOSFETs 1724 and 1726. The drain of MOSFET 1724, which is the input transistor for the non-inverting input (+) of high gain amplifier 1324, is coupled to the drain of MOSFET 1736 and to the source of MOSFET 1740. The drain of MOSFET 1726, which is the input transistor for the inverting input (−) of high gain amplifier 1324, is coupled to the drain of MOSFET 1738 and to the source of MOSFET 1742.

In FIG. 17, the output (labeled O) of the folded cascode used to implement high gain amplifier 1324 is taken from the coupled drains of MOSFETs 1734 and 1742. This output also serves as the output for auto-zero amplifier 1320 of FIG. 13. An output lead, labeled C_out in FIG. 17, is also coupled to one terminal of the integrating feedback capacitor Cint of auto-zero amplifier 1320 of FIG. 13.

As discussed above with reference to FIG. 13, switch 1332 couples the inverting input (i.e., the gate of MOSFET 1726) of high gain amplifier 1324 to the output (labeled node O) of high gain amplifier 1324 during reset operation. In the embodiment of FIG. 17, switch 1332 is implemented as a standard logic transmission gate including an n-type MOSFET 1748 and a p-type MOSFET 1750 with drains and sources coupled in parallel. The gate of n-type MOSFET 1748 is controlled by signal RST, while the gate of p-type MOSFET 1750 is controlled by a signal RST_B, which is the complementary signal of signal RST. This switch configuration allows passing of the full voltage range of the output voltage to the gate of MOSFET 1726.

As discussed above with reference to FIG. 13, switch 1334 couples the non-inverting input (i.e., the gate of MOSFET 1724) of high gain amplifier 1324 to reference voltage VAMPREF during reset operation. In the embodiment of FIG. 17, switch 1334 is implemented as another transmission gate including an n-type MOSFET 1752 and a p-type MOSFET 1754 with drains and sources coupled in parallel. The gates of MOSFETs 1752 and 1754 are controlled by complementary signals RST and RST_B. respectively. Like the transmission gate of switch 1332, the configuration of switch 1334 allows passing of the full voltage range of reference voltage VAMPREF to the gate of MOSFET 1724.

Figure 18:
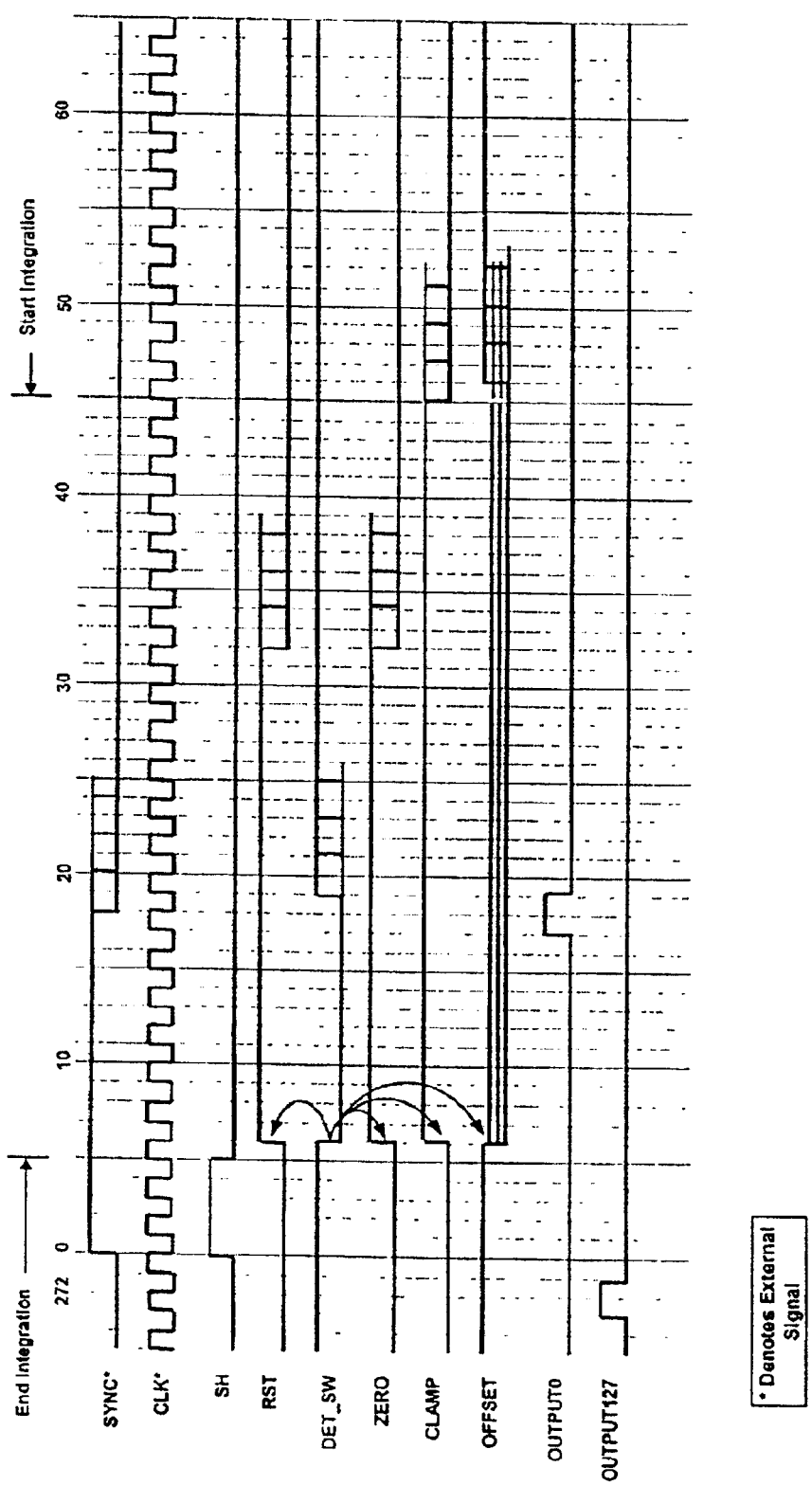
FIG. 18 is a timing diagram for an electro-optical detector array.

FIG. 18 is a timing diagram for an electro-optical detector array. As discussed briefly above with reference to FIG. 13, the reset process for auto-zero amplifier 1320 begins by isolating detector 1310 from the non-inverting input (+) of fixed gain amplifier 1322 by opening switch 1326 with signal Det_Sw (FIG. 13 and FIG. 16). Signals ZERO and RST are then respectively applied to close switches 1328 and 1330. This clamps detector 1310 to reference voltage VREF. Isolating, and subsequently clamping, detector 1310 prevents a large voltage feed-through from occurring on terminal 1313 of detector 1310. During the reset process, switches 1332 and 1334 (FIG. 13 and FIG. 17) are also closed in response to signal RST. The reset process is completed by first reconnecting detector 1310 to the non-inverting input (+) of fixed gain amplifier 1322 by closing switch 1326 with signal Det_Sw. Subsequently, switches 1328 and 1330 are opened by signals ZERO and RST. The relative timing of signals Det_Sw (also labeled DET_SW), ZERO, and RST is shown in FIG. 18.

Several additional signals are also shown in FIG. 18. A signal SYNC and a signal CLK are external timing generation signals supplied to the integrated circuit (i.e., the electro-optical sensor) for timing control. The signal CLK may be a clock signal. Using the signals SYNC and CLK and conventional CMOS logic techniques, the integrated circuit derives a plurality of analog control signals including signal RST, signal DET_SW, signal ZERO, a signal SH, a signal CLAMP, and a signal OFFSET. The use and operation of signals DET_SW, RST, and ZERO was discussed previously.

Signal SH enables sample and hold stage 1150 of FIG. 11 to sample the output from either auto-zero amplifier 1120 or clamp stage 1140. For example, in FIG. 12, signal SH controls switch 1252. Closing switch 1252 passes the output signal from clamp stage 1140 to variable capacitor 1254. Alternatively, if offset stage 1230 and clamp stage 1140 of FIG. 12 are bypassed, switch 1292 is closed to pass the output signal from auto-zero amplifier 1120 to variable capacitor 1254. Switch 1292 is controlled by signal ITR, which performs a function similar to signal SH shown in FIG. 18.

Signals OFFSET and CLAMP control offset stage 1130 and clamp stage 1140 of FIG. 11. In particular, signal CLAMP can enable clamping of the output signal level from auto-zero amplifier 1120 just after the reset process is completed. This removes any voltage offset introduced into auto-zero amplifier 1120, and it removes any KTC noise introduced in the output signal chain by opening reset switches 1330 and 1332. As seen in FIG. 12, signal OFFSET can supply an additional adjustable offset voltage level from offset stage 1230 to clamp stage 1140. The adjustable offset voltage level facilitates accommodation of differences in the background signal levels of various systems.

Two signals OUTPUT0 and OUTPUT127 are also shown in FIG. 18. These two signals are control signals (i.e., select signals) for multiplexer 1160 (see FIG. 12).

Figure 19:
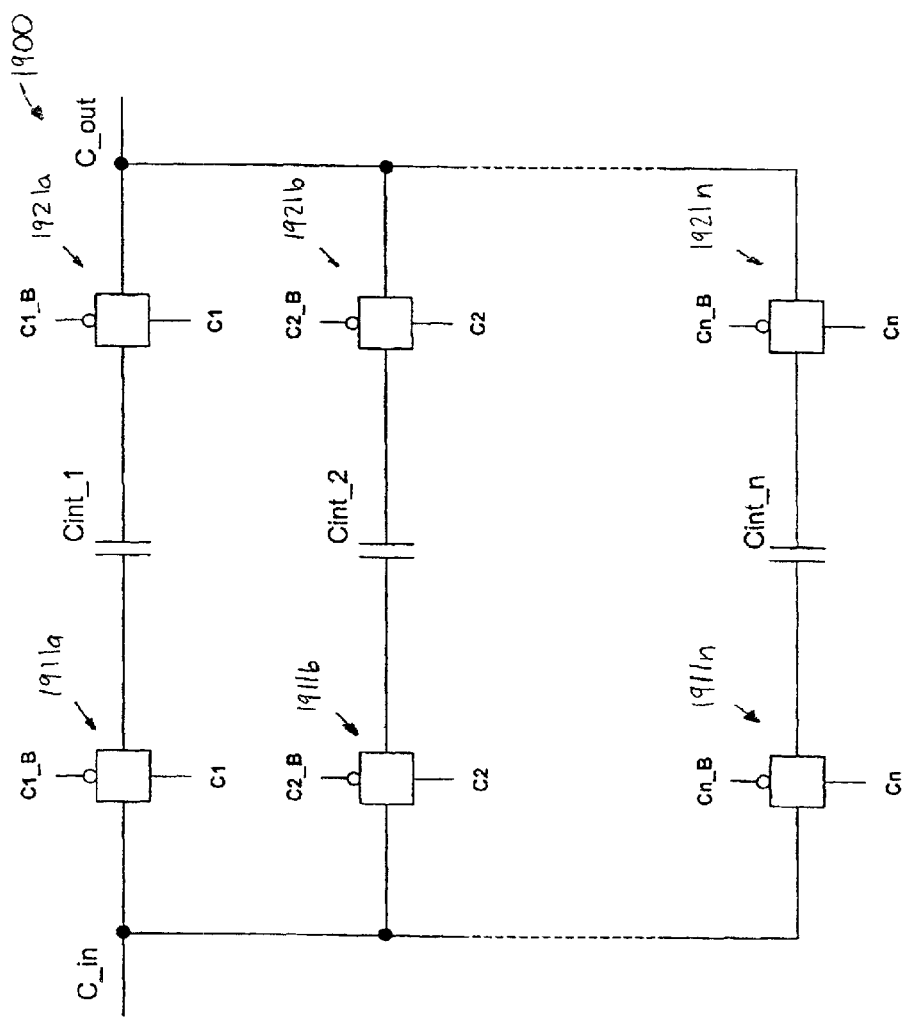
FIG. 19 is a circuit diagram of an embodiment of a feedback capacitor network for integrating feedback capacitor Cint of the auto-zero amplifiers of FIG. 13, FIG. 14, and FIG. 15.

Integrating feedback capacitor Cint of auto-zero amplifier 1320 in FIGS. 13 and 14 and of auto-zero amplifier 1520 in FIG. 15 is shown schematically as a single capacitor, which is coupled between lead C_in of FIG. 16 and lead C_out of FIG. 17. It is possible, however, that in some embodiments, integrating feedback capacitor Cint may include a network of capacitors. FIG. 19 is a circuit diagram of an embodiment of a feedback capacitor network 1900 for integrating feedback capacitor Cint of auto-zero amplifiers 1320 and 1520 of FIGS. 13, 14, and 15. In the embodiment of FIG. 19, feedback capacitor Cint is implemented as a plurality of feedback capacitors labeled Cint_1 through Cint_n coupled in parallel between lead C_in and lead C_out. The dashed lines indicate additional capacitors not shown. As shown in FIG. 16, lead C_in is coupled to the non-inverting input (+) of fixed gain amplifier 1322 (i.e., the first stage of auto-zero amplifier 1320). As shown in FIG. 17, lead C_out is coupled to the output of high gain amplifier 1324 (i.e., the second stage of auto-zero amplifier 1320).

Also shown in network 1900 of FIG. 19, is a plurality of standard logic transmission gates 1911a through 1911n, and 1921a through 1921n, each including an n-type MOSFET and a p-type MOSFET coupled in parallel. Transmission gates 1911a, 1911b, through 1911n are respectively coupled between lead C_in and feedback capacitors Cint_1, Cint_2, through Cint_n. Transmission gates 1921a 1921b, through 1921n are respectively coupled between lead C_out and feedback capacitors Cint_1, Cint_2, through Cint_n. Transmission gates for feedback capacitors not shown in FIG. 19 are also not shown.

In some embodiments only a single transmission gate is coupled in series with each feedback capacitor Cint_1 through Cint_n between leads C_in and C_out. In this case, transmission gates 1911a through 1911n, coupled to lead C_in (the input side of auto-zero amplifiers 1320 and 1520 of FIGS. 13, 14, and 15), may be used. Thus, the output (coupled to lead C_out, of auto-zero amplifiers 1320 and 1520 of FIGS. 13, 14, and 15 will drive the parasitic capacitances associated with each feedback capacitor Cint_1 through Cint_n. By incorporating two transmission gates per feedback capacitor (e.g., transmission gates 1911a and 1921a for feedback capacitor Cint_1, etc.), both the input node (i.e., lead C_in) of fixed gain amplifier 1322 and the output node (i.e., lead C_out) of high gain amplifier 1324 are unloaded from the parasitic capacitance associated with a particular feedback capacitor when it is not selected.

Implementation of integrating feedback capacitor Cint of auto-zero amplifiers 1320 and 1520 of FIGS. 13, 14, and 15 as a network such as network 1900 of FIG. 19 allows tailoring of the value of the trans-impedance of auto-zero amplifiers 1320 and 1520. Each feedback capacitor Cint_1 through Cint_n may be selected for use singly or in various parallel combinations with other feedback capacitors Cint_1 through Cint_n. Each feedback capacitor Cint_1 through Cint_n is selected using a plurality of complementary control signals applied to their respective transmission gates (1911a through 1911n and 1921a through 1921n). For example, feedback capacitor Cint_1 is selected by enabling transmission gates 1911a and 1921a, which are controlled by complementary signals C1 (applied to the n-type MOSFETs of gates 1911a and 1921a) and C1_B (applied to the p-type MOSFETs of gates 1911a and 1921a). The various combinations of feedback capacitors Cint_1 through Cint_n allow the size of the output voltage signal from auto-zero amplifiers 1320 and 1520, as a function of the input current, to be controlled and adjusted.

A critical consideration for implementing two-stage auto-zero amplifiers 1320 and 1520 of FIGS. 13, 14, and 15 is to maintain the stability of auto-zero amplifiers 1320 and 1520 and of feedback capacitor network 1900 of FIG. 19. Additionally, since feedback capacitor network 1900 results in a programmable transimpedance due to the multiple feedback capacitors Cint_1 through Cint_n, it is also important to ensure that network 1900 and auto-zero amplifiers 1320 and 1520 are stable for each trans-impedance setting. One method to ensure stability for each trans-impedance setting is to incorporate band-limiting capacitance into feedback capacitor network 1900.

Figure 20:
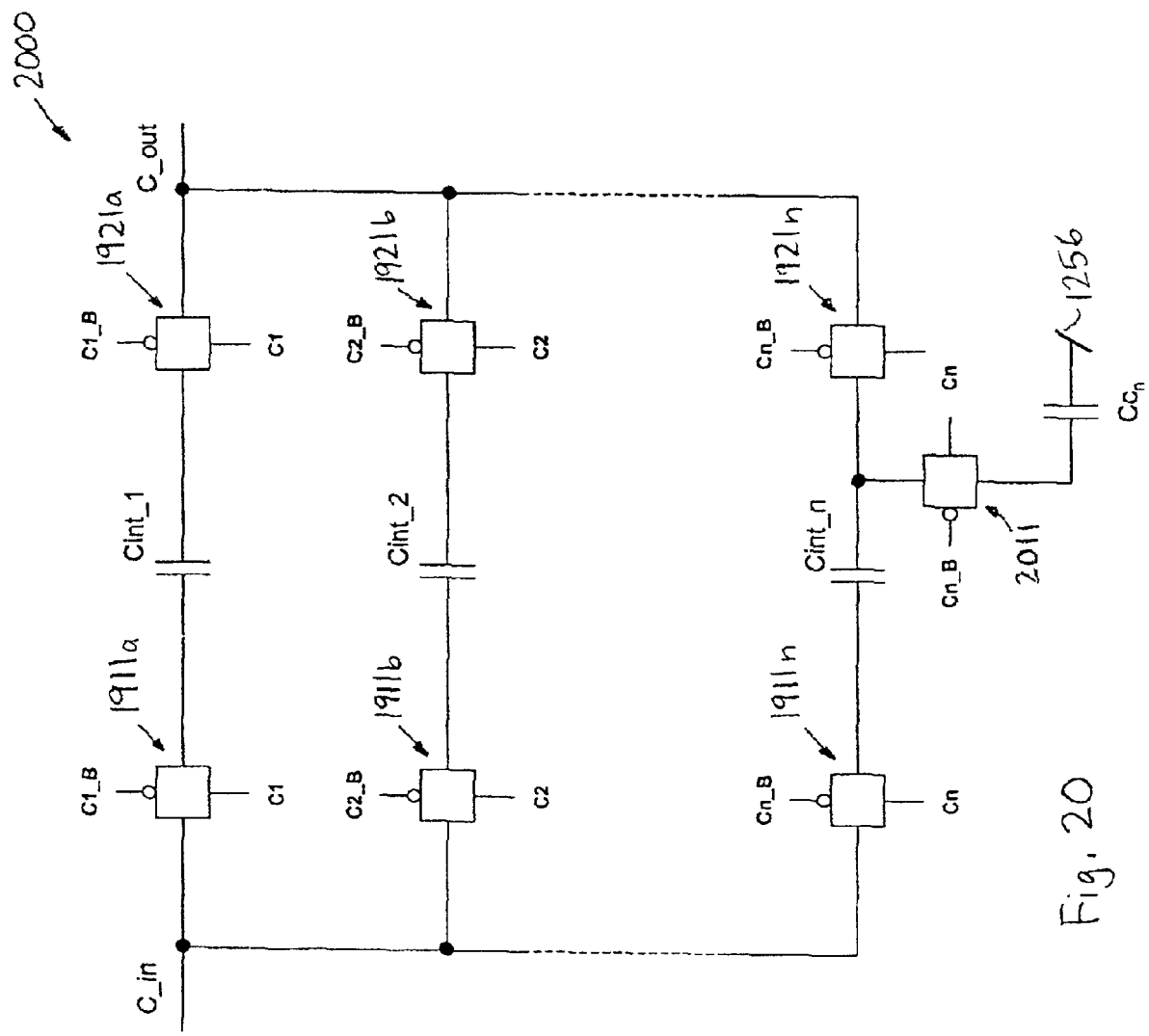
FIG. 20 is a circuit diagram of an embodiment of a feedback capacitor network, including band-limiting capacitance for stability compensation.

FIG. 20 is a circuit diagram of an embodiment of a feedback capacitor network 2000, including band-limiting capacitance for stability compensation. Feedback capacitor network 2000 is similar to network 1900 of FIG. 19 and has many similar elements. In network 2000 of FIG. 20, however, a band-limiting capacitor $Cc_n$ is coupled in series with a standard logic transmission gate 2011 between one terminal of feedback capacitor Cint_n and a ground or reference supply terminal, which may be ground terminal or reference voltage 1256. Transmission gate 2011 is controlled by the same complementary signals Cn and Cn_B that control transmission gates 1911n and 1921n. When feedback capacitor Cint_n is selected, signals Cn and Cn_B enable transmission gates 1911n, 1921n, and 2011, thereby selecting capacitor $Cc_n$ as well.

Each branch of network 2000 may have a similar band-limiting capacitor $Cc_n$ coupled to the respective feedback capacitor (e.g., Cint_1, Cint_2, etc.). Additionally, the size of the band-limiting capacitor $Cc_n$ in each branch may vary. The size of the band-limiting capacitors $Cc_n$ can be selected such that the stability of auto-zero amplifiers 1320 and 1520 (FIGS. 13, 14, and 15) is improved and optimized for any selection of feedback capacitors Cint_1 through Cint_n.

Figure 21:
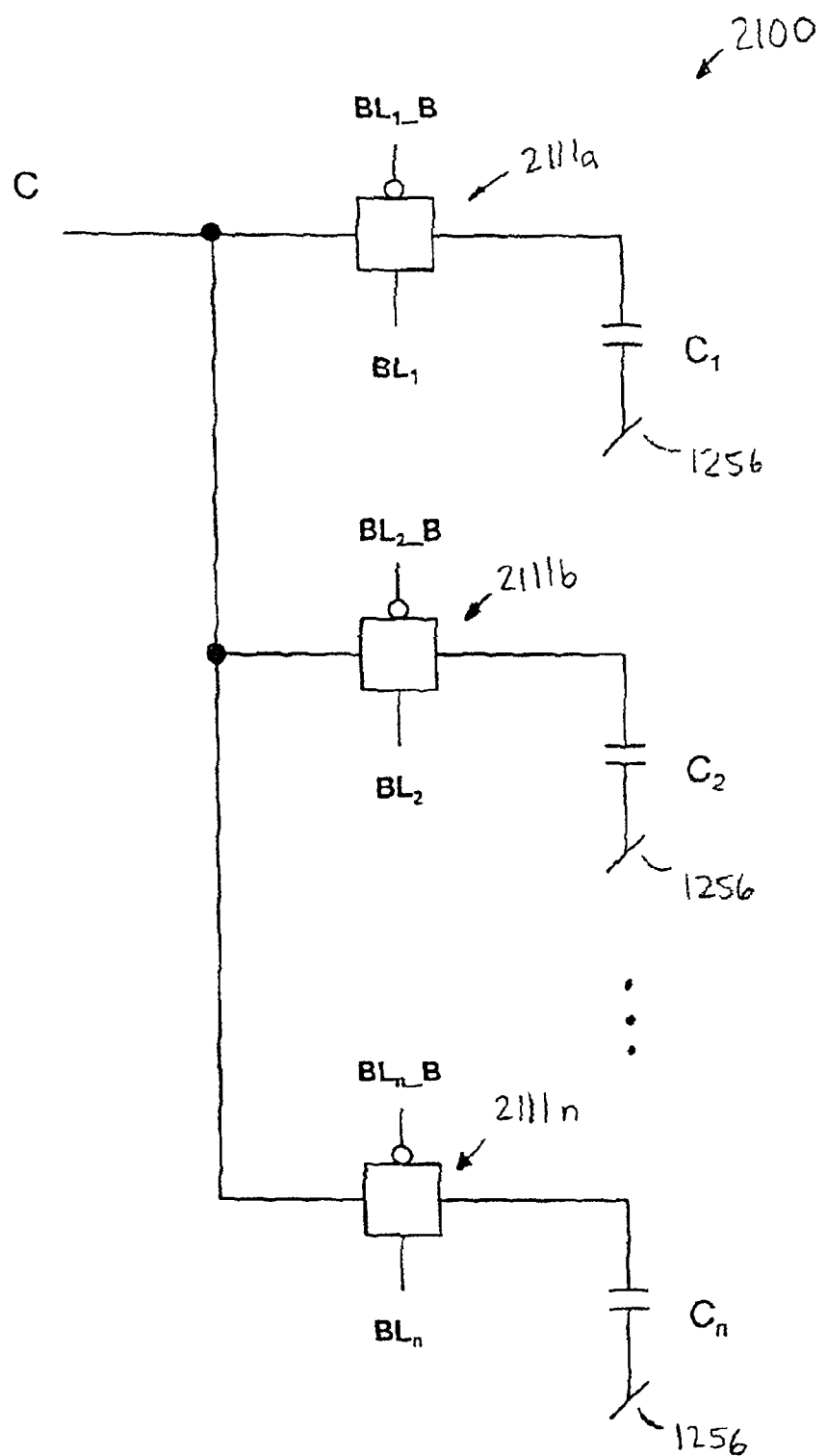
FIG. 21 is a circuit diagram of an embodiment of an alternative capacitor network for stability compensation of the two-stage auto-zero amplifiers of FIGS. 13, 14, and 15.

FIG. 21 is a circuit diagram of an embodiment of an alternative capacitor network 2100 for stability compensation of two-stage auto-zero amplifiers 1320 and 1520 of FIGS. 13, 14, and 15. Capacitor network 2100 is particularly useful in electronics signal chains such as signal chain 1200 of FIG. 12 in which offset stage 1230 and clamp stage 1140 are bypassed using the path controlled by switch 1292. In this case, sample and hold stage 1250 can be used to provide programmable band-limiting for stabilizing auto-zero amplifier 1120 (or auto-zero amplifiers 1320 or 1520 of FIGS. 13, 14, or 15), or to optimize the noise bandwidth of auto-zero amplifier 1120.

In the embodiment of FIG. 21, variable capacitor 1254 of sample and hold stage 1250 of FIG. 12 can be implemented as a plurality of band-limiting capacitors labeled $C_1$ through $C_n$ coupled in parallel between node C and ground terminal or reference voltage 1256. The dots indicate additional capacitors not shown. A plurality of standard logic transmission gates 2111a through 2111n can be used as switches to enable one or more of capacitors $C_1$ through $C_n$, thereby varying the size of variable capacitor 1254 in sample and hold stage 1250 of FIG. 12. Transmission gates for capacitors not shown in FIG. 21 are also not shown. Transmission gates 2111a through 2111n in are coupled between node C and a respective capacitor $C_1$ through $C_n$.

When offset stage 1230 and clamp stage 1140 are bypassed using the path controlled by switch 1292 shown in FIG. 12, the size of variable capacitor 1254 in sample and hold stage 1250 affects the bandwidth of auto-zero amplifier 1120. Capacitor network 2100 of FIG. 21 can be used, in lieu of sample and hold stage 1250 in FIG. 12, to optimize the stability of auto-zero amplifier 1120 (or auto-zero amplifiers 1320 or 1520 of FIGS. 13, 14, or 15) as well as to control and optimize the noise bandwidth.

Figure 22:
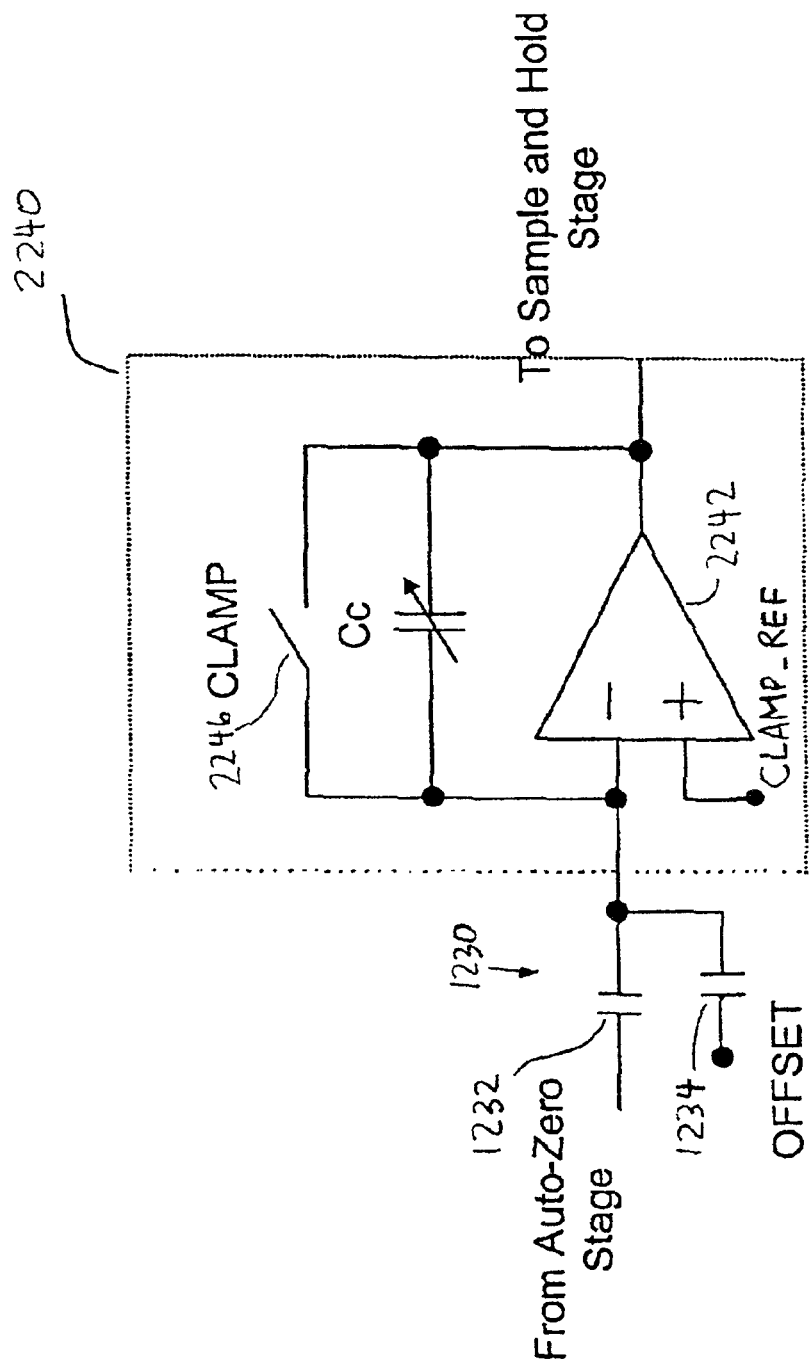
FIG. 22 is a circuit diagram of the offset stage and an embodiment of a clamp stage of the electronics signal chain of FIG. 12.

FIG. 22 is a circuit diagram of offset stage 1230 of FIG. 12 coupled to a clamp stage 2240. Clamp stage 2240 may be an embodiment of clamp stage 1140 of electronics signal chain 1200 of FIG. 12. Capacitor 1232 of offset stage 1230 serves as a coupling capacitor between the output of auto-zero amplifier 1120 of FIG. 12 and the input of clamp stage 2240 of FIG. 22. Auto-zero amplifier 1120 may be implemented as auto-zero amplifier 1320 of FIGS. 13 or 14, as auto-zero amplifier 1520 of FIG. 15, or another embodiment.

In FIG. 22, the input of clamp stage 2240 is coupled to the inverting input (−) of a charge ratio gain amplifier 2242. The nor-inverting input (+) of charge ratio gain amplifier 2242 is coupled to a reference voltage CLAMP_REF. A variable feedback capacitor Cc is coupled between the inverting input (−) and the output of charge ratio gain amplifier 2242. To first order, the ratio between capacitor 1232 and variable feedback capacitor Cc determines the gain of clamp stage 2240. A feedback switch, controlled by signal CLAMP as discussed previously with reference to FIG. 18, is coupled in parallel with capacitor Cc. The output of charge ratio gain amplifier 2242 also serves as the output of clamp stage 2240. The output of clamp stage 2240 is coupled to the input of a sample and hold stage, which may be, for example, sample and hold stage 1250 of FIG. 12.

Clamp stage 2240 of FIG. 22 has three main functions. First, feedback switch 2246, controlled by signal CLAMP, in clamp stage 2240 can remove the reset signal from auto-zero amplifier 1120 (FIG. 12). As discussed above with reference to FIG. 18, this removes KTC noise introduced in electronics signal chain 1200 by auto-zero amplifier 1120 during the reset process. Second, clamp stage 2240 of FIG. 22 can adjust the signal level and gain from auto-zero amplifier 1120 (FIG. 12). The adjustment occurs because the zero signal level received from auto-zero amplifier 1120 is re-referenced to the bias level of reference voltage CLAMP_REF coupled to the non-inverting input (+) of charge ratio gain amplifier 2242 of clamp stage 2240. Third, in conjunction with offset stage 1230, clamp stage 2240 of FIG. 22 offers a dynamic offset capability through signal OFFSET. Signal OFFSET is coupled to the inverting input (−) of charge ratio gain amplifier 2242, in clamp stage 2240, through capacitor 1234 of offset stage 1230. Signal OFFSET may be a clocked waveform of variable amplitude, which can affect the inverting response of charge ratio gain amplifier 2242. Thus, signal OFFSET can be used to remove background signal levels from auto-zero amplifier 1120 (FIG. 12). Typical timing and characteristics of signals CLAMP and OFFSET are shown in FIG. 18.

The various amplifiers (e.g., auto-zero amplifier 1320 of FIGS. 13 and 14 and charge ratio gain amplifier 2242 of FIG. 22) used in the various signal chains of an electro-optical detector may require several reference biases and reference potentials. For example, fixed gain amplifier 1322 (FIG. 16) and high gain amplifier 1324 (FIG. 17) of auto-zero amplifier 1320 (FIGS. 13 and 14) include reference currents provided by biasing signals AMP_CS1, AMP_CS2, AMP_CS3, and AMP_CS4. The reference textbook cited above, entitled "CMOS Analog Circuit Design," by Phillip E. Allen and Douglas R. Holberg, published by Hold, Reinhart, and Winston, 1987, also provides an excellent reference regarding bias and reference current generation for CMOS differential amplifiers.

Figure 23:
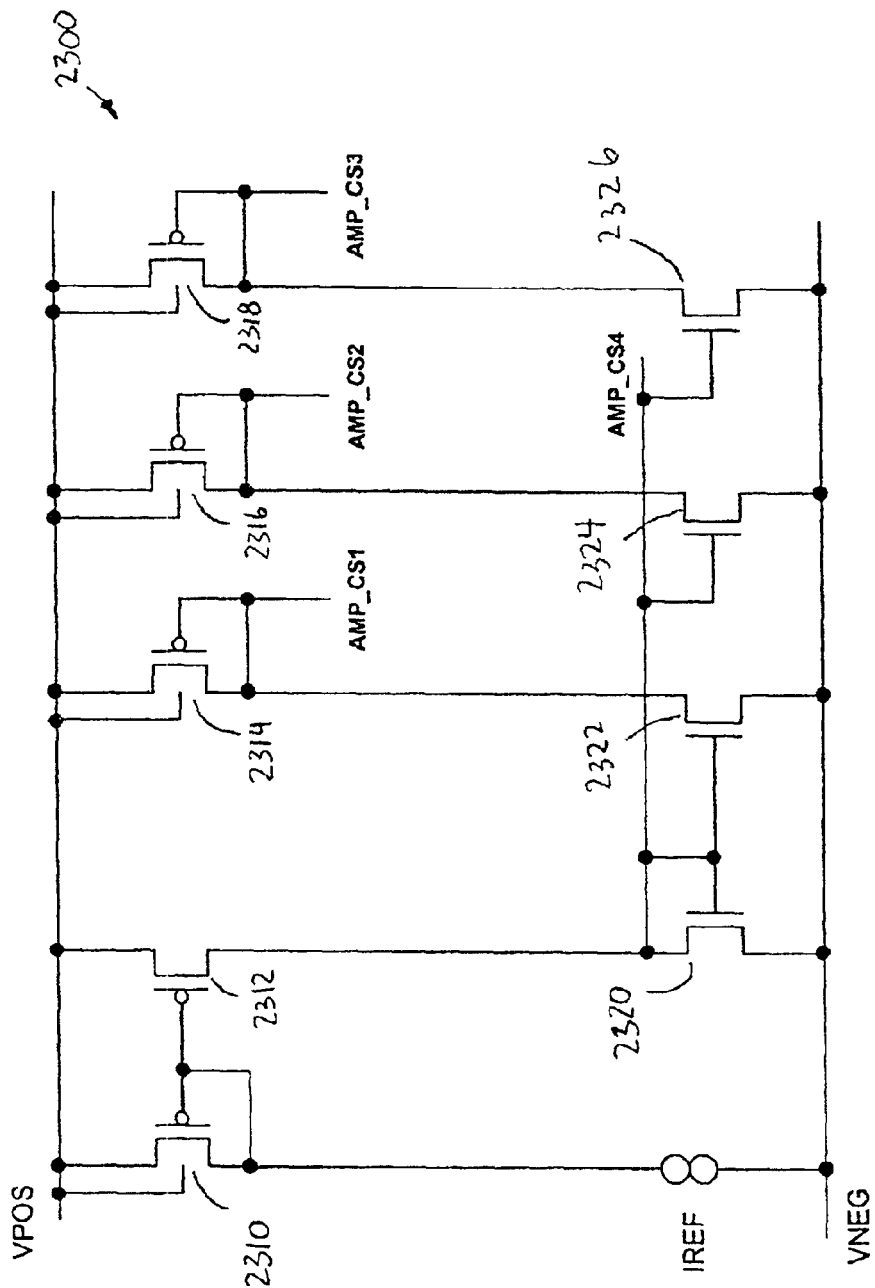
FIG. 23 is a circuit diagram of an embodiment of a reference current generation circuit for the auto-zero amplifiers of FIGS. 13, 14, and 15.

FIG. 23 is a circuit diagram of an embodiment of a reference current generation circuit 2300 for auto-zero amplifiers 1320 and 1520 of FIGS. 13, 14, and 15. A plurality of p-type MOSFETs 2310, 2312, 2314, 2316, and 2318 and a plurality of n-type MOSFETs 2320, 2322, 2324, and 2326 form a series of current sources for bias signal generation. The sources and bodies of p-type MOSFETs 2310, 2312, 2314, 2316, and 2318 are coupled to reference voltage VPOS. The sources and bodies of n-type MOSFETs 2320, 2322, 2324, and 2326 are coupled to reference voltage VNEG. MOSFETs 2310, 2314, 2316, 2318, and 2320 are diode-connected (i.e., with their respective drains coupled to their respective gates).

MOSFETs 2310 and 2312, with gates coupled together, form a current mirror, which mirrors the current from a reference current source IREF coupled between the drain of MOSFET 2310 and reference voltage VNEG. Reference current source IREF can be provided on-chip or off-chip. The drains of MOSFETs 2312 and 2320 are coupled together and to the gates of n-type MOSFETs 2320, 2322, 2324, and 2326, thereby mirroring the current of current source IREF again in MOSFETs 2320, 2322, 2324, and 2326.

The drains of MOSFETs 2322 and 2314 are coupled together so that the current mirrored by MOSFET 2322 is mirrored by MOSFET 2314 to establish the reference current (biasing signal AMP_CS1) for fixed gain amplifier 1322 in two-stage auto-zero amplifier 1320 (FIG. 13 and FIG. 16). Similarly, the currents mirrored by MOSFETs 2316, 2318, and 2320 establish the reference currents (biasing signals AMP_CS2, AMP_CS3, and AMP_CS4) for high gain amplifier 1324 of auto-zero amplifier 1320 (FIG. 13 and FIG. 17), since the drains of MOSFET pairs 2324/2316 and 2326/2318 are coupled together. Biasing signals AMP_CS1, AMP_CS2, AMP_CS3, and AMP_CS4 represent fractions of reference current source IREF, depending on the relative sizes of the MOSFETs that form the various current mirrors. Similar methods can be used to establish the reference currents needed for the various amplifiers in the various signal chains 1200 of FIG. 12 used in an electro-optical sensor.

Figure 24:
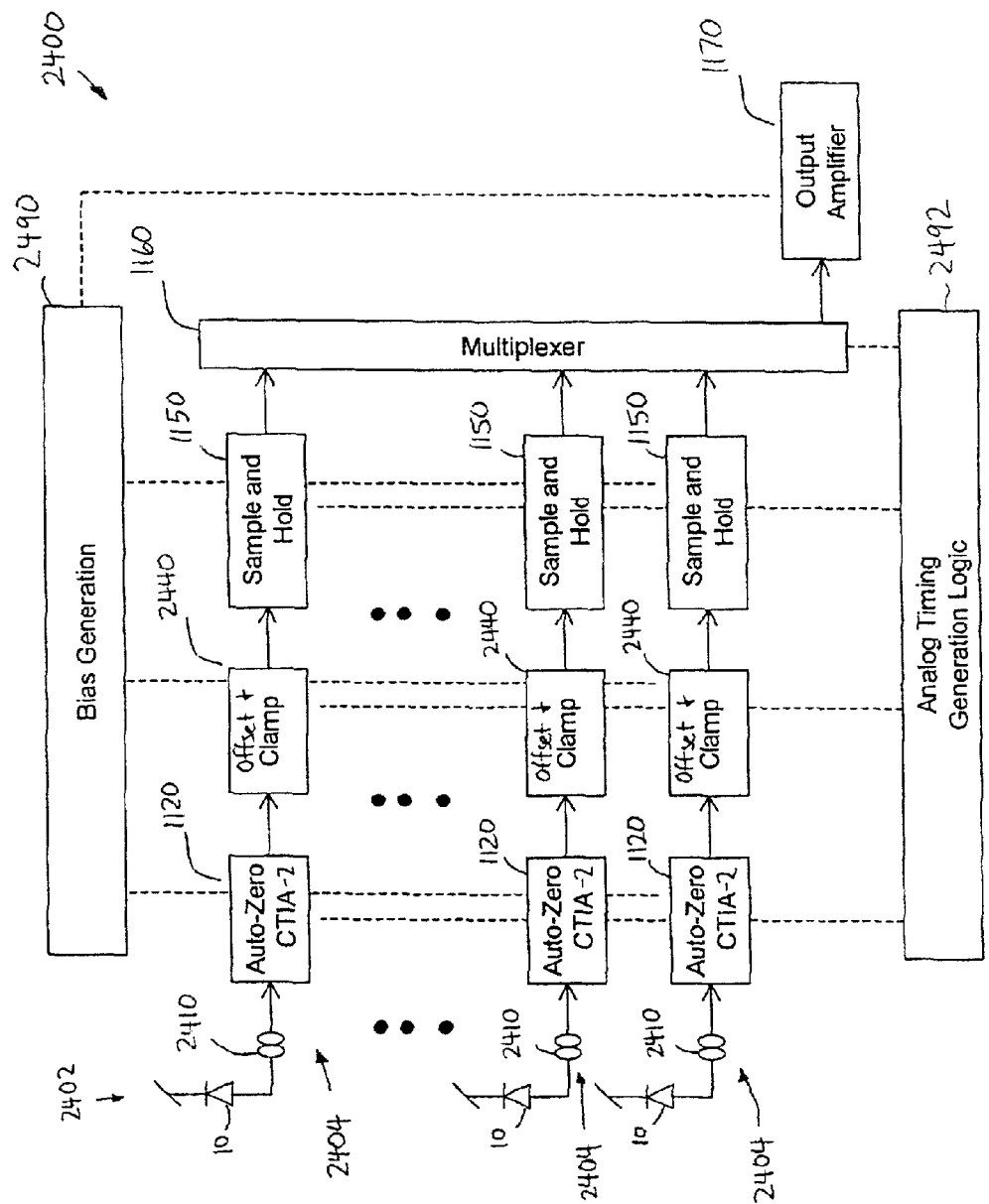
FIG. 24 is a block diagram illustrating a portion of an electro-optical sensor.

FIG. 24 is a block diagram illustrating a portion 2400 of an electro-optical sensor. Electro-optical sensor portion 2400 includes a detector array 2402, which includes a plurality of detector elements 10. Each detector element 10 is coupled to a respective electronics signal chain 2404, which is similar to signal chain 1100 of FIG. 11. Each signal chain 2404 includes a detector interface 2410, two-stage auto-zero amplifier 1120, an offset and clamp stage 2440, and sample and hold stage 1150. Signal chains 2404 share multiplexer 1160 and output amplifier 1170. The dots indicate additional detector elements 10 and signal chains 2404 not shown. Each detector element 10 is coupled to its respective signal chain 2404 through a detector interface 2410, which may include detector interface 1210 of FIG. 12. Two-stage auto-zero amplifier 1120 may include auto-zero amplifiers 1320 or 1520 of FIGS. 13, 14, or 15. Offset and clamp stage 2440 may include offset stage 1230 and clamp stage 2240 of FIG. 22.

Also shown in electro-optical sensor portion 2400 of FIG. 24 are a bias generation circuit 2490 and an analog timing generation circuit 2492. Bias generation circuit 2490, which may include reference current generation circuit 2300 of FIG. 23, provides biasing signals throughout signal chains 2404 and to amplifier 1170. Analog timing generation circuit 2492 may include logic gates configured to generate some of the timing signals shown in FIG. 18 (e.g., signals DET_SW, RST, ZERO, CLAMP, and OFFSET) for the different elements of signal chains 2404 and for multiplexer 1160.

Figure 25:
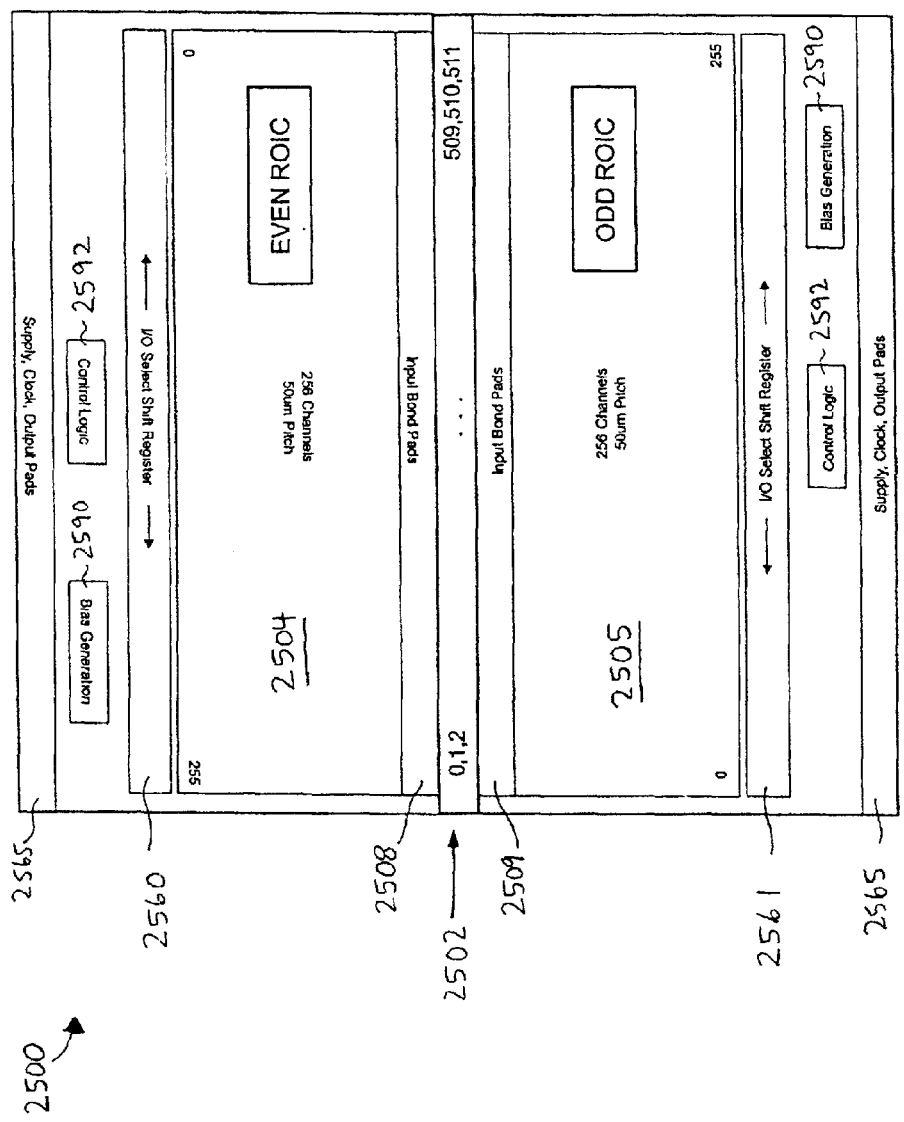
FIG. 25 is a graphical illustration of the layout of an electro-optical sensor chip including a 1×512 linear detector array.

The block diagram of electro-optical sensor portion 2400 of FIG. 24 shows the inter-relationships of some of the components of an electro-optical sensor chip. FIG. 25 is a graphical illustration of the layout of an electro-optical sensor chip 2500 including a 1×512 linear detector array 2502. Electro-optical sensor chip 2500 is implemented with mirror symmetry around detector array 2502, which is located along the center line of sensor chip 2500. An even signal chain block 2504 includes the electronics signal chains (i.e., signal chains 2404 of FIG. 24) associated with the even-numbered detector elements (i.e., detector elements 10 of FIG. 1) of detector array 2502. Similarly, an odd signal chain block 2505 includes the signal chains associated with the odd-numbered detector elements of detector array 2502. Even and odd signal chain blocks 2504 and 2505 include input bond pad arrays 2508 and 2509, respectively, for coupling each of the detector elements in detector array 2502 to respective detector interfaces in signal chain blocks 2504 and 2505.

Electro-optical sensor chip 2500 of FIG. 25 also includes an even input/output (I/O) select shift register 2560 and an odd I/O select shift register 2561. Shift registers 2560 and 2561 may perform multiplexer channel selection for the 1×512 linear detector array 2502. A plurality of I/O pads 2565 is used for external communication. I/O pads 2565 may include pads, for example, for power supply, clock, and output coupling.

Electro-optical sensor chip 2500 of FIG. 25 also includes a plurality of bias generation circuits 2590 and a plurality of control logic circuits 2592. Bias generation circuits 2590, each of which may include bias generation circuit 2490 of FIG. 24, generate the biases voltages and currents for electro-optical sensor chip 2500. Control logic circuits 2592, each of which may include analog timing generation circuit 2492 of FIG. 24, use conventional CMOS logic techniques to generate logic control signals, analog control signals, and multiplexer control signals for chip 2500. The reference textbook entitled "Introduction to VLSI Systems," by Carver Mead and Lynn Conway, published by Addison Wesley in 1987, provides an excellent reference regarding the use of CMOS logic to generate control signals for CMOS integrated circuits.

Figure 26:
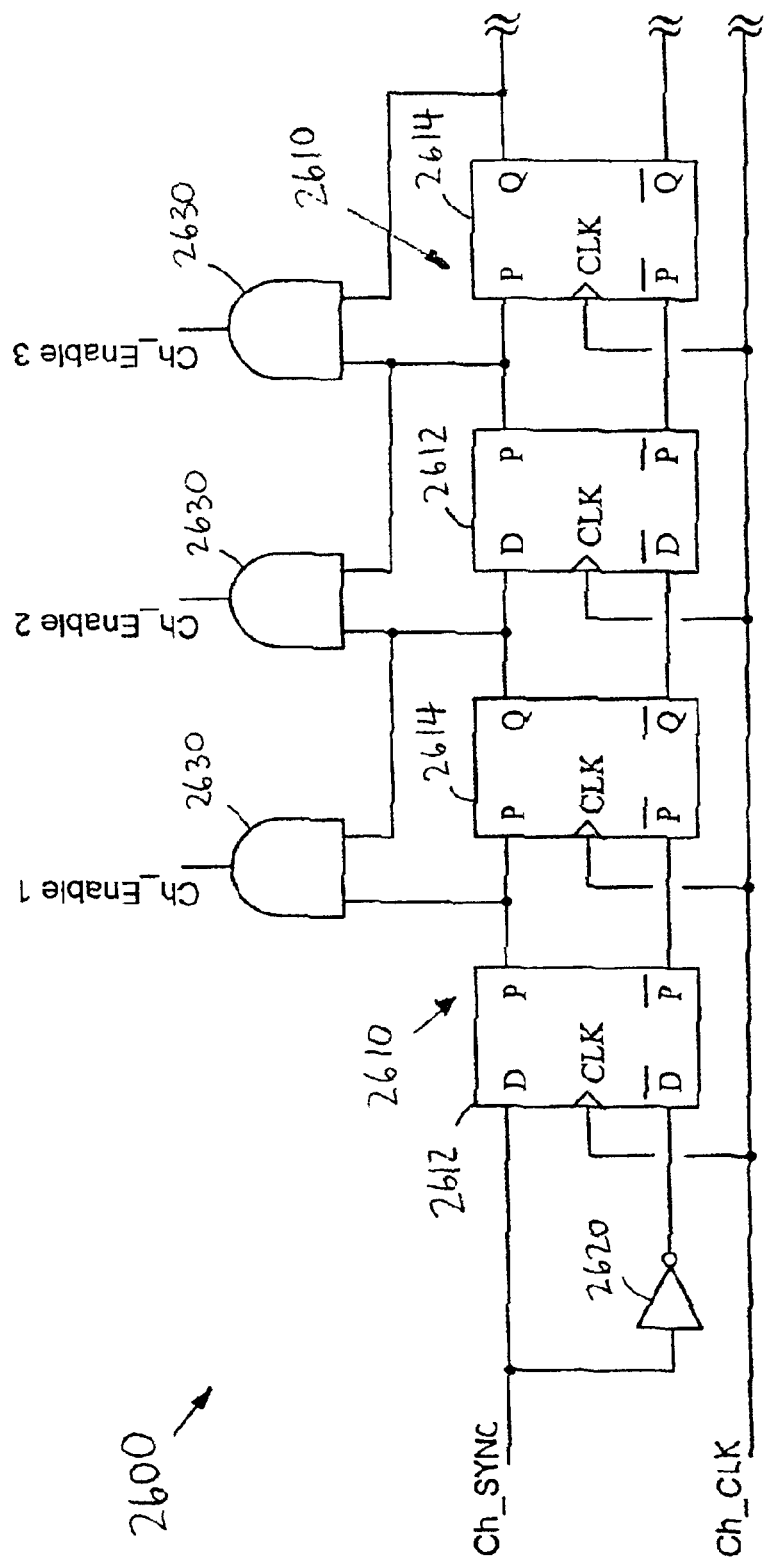
FIG. 26 is a circuit diagram of a shift register portion for performing multiplexer channel selection for the electro-optical sensor chip of FIG. 25.

FIG. 26 is a circuit diagram of a portion of a shift register 2600 for performing multiplexer channel selection for electro-optical sensor chip 2500 of FIG. 25. In FIG. 26, a plurality of DQ flip-flops 2610 is serially coupled to form shift register 2600, as is well known. Each DQ flip-flop 2610 includes a master latch 2612 that drives a slave latch 2614. The center tap between each master latch 2612 and slave latch 2614 is labeled P. A clock signal Ch_CLK is provided to the CLK input of each master and slave latch 2612 and 2614. A channel select pulse (i.e., a data input signal) Ch_SYNC is provided to the D input of the first DQ flip-flop 2610 in the series. An inverter 2620 provides the inverted channel select pulse to the D bar input of the first DQ flip-flop 2610. The Q and Q bar outputs of each DQ flip-flop 2610 are coupled to the D and D bar inputs, respectively, of the subsequent DQ flip-flop 2610.

The input and output of each master and slave latch 2612 and 2614 (except for the first master latch 2612) are respectively coupled to the inputs of a plurality of two-input AND gates 2630. For each master latch 2612, the inputs to respective AND gates 2630 include input D and center tap P of master latch 2612. For each slave latch 2614, the inputs to respective AND gates 2630 include center tap P and output Q of slave latch 2614. The outputs of AND gates 2630 produce a plurality of decode signals Ch_Enable1 through Ch_EnableN (not shown), which control the selection of the electronics signal chains (i.e., signal chains 2404 of FIG. 24). AND gates 2630 decode the location of a pulse traveling down the shift register so that the signal chains are selected one after another, producing a multiplexed output of the signal chain outputs as is known in the art.

Figure 27:
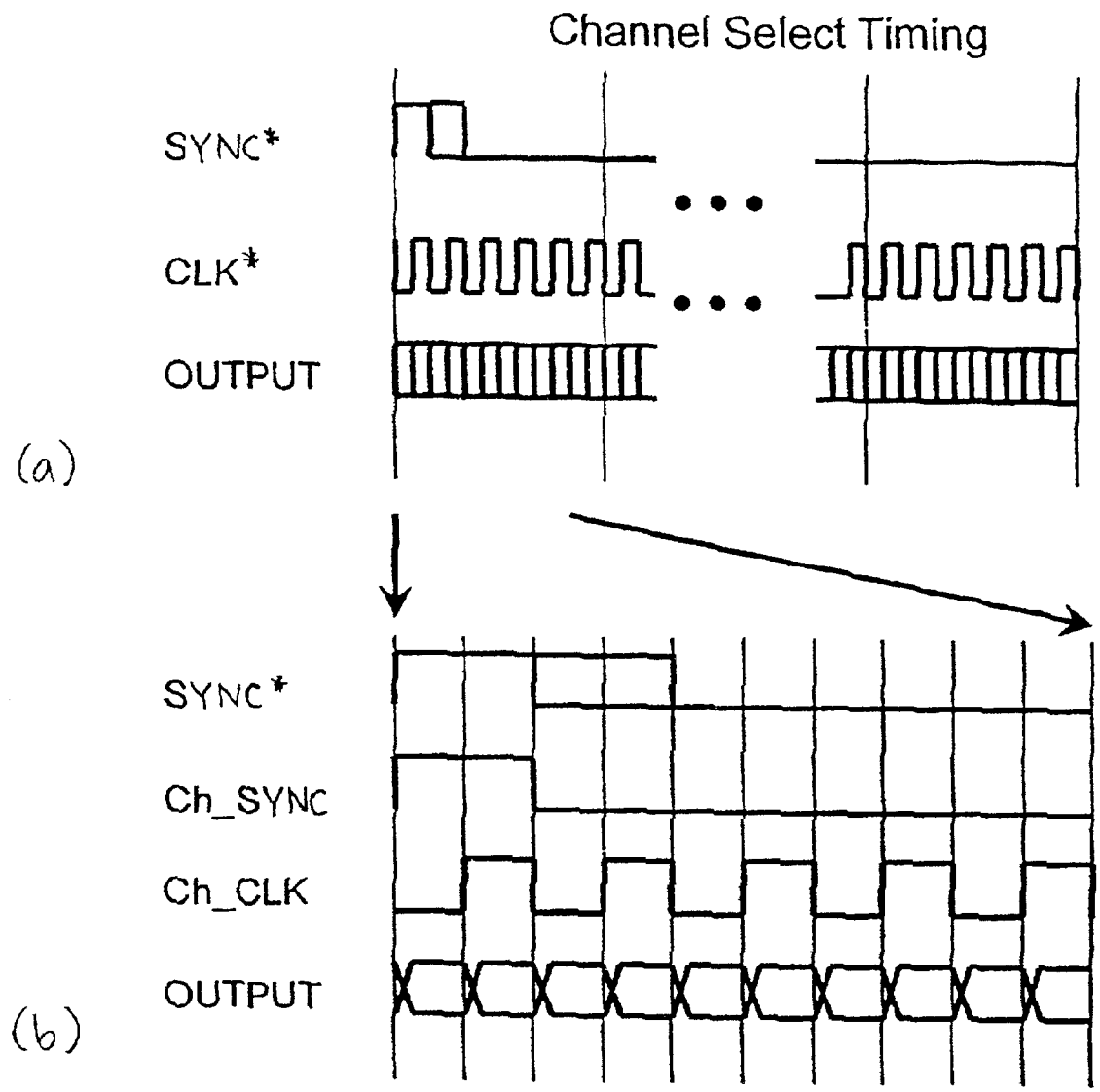
FIG. 27 is a timing diagram including signals for the electro-optical sensor chip of FIG. 25 and for the shift register of FIG. 26.

FIG. 27 is a timing diagram including signals for electro-optical sensor chip 2500 of FIG. 25 and for shift register 2600 of FIG. 26. In FIG. 27(a), signals SYNC and CLK (see also FIG. 18) supplied to electro-optical sensor chip 2500 of FIG. 25 are shown along with the output signal (OUTPUT) produced by the multiplexer (i.e., multiplexer 1160 of FIG. 24) in chip 2500. FIG. 27(b) shows detail of the initial time period of FIG. 27(a). Signal SYNC is used to generate channel select pulse Ch_SYNC that is input to shift register 2600 (FIG. 26). Shift register 2600 (FIG. 26) is clocked with signal Ch_CLK to move channel select pulse Ch_SYNC down shift register 2600, enabling each subsequent signal chain (i.e., of signal chains 2404 of FIG. 24) for output multiplexing. Since select pulse Ch_SYNC is decoded using at least one center tap P from a DQ flip-flop 2610 (FIG. 26), the output selection occurs on the half clock for each signal chain.

Incorporation of on-chip biases, on-chip clock generation, and the advanced two-stage auto-zero amplifier allows for a high performance integrated circuit for electro-optical sensors. The foregoing embodiments are intended to be illustrative and not limiting of the broad principles of this invention. Many additional embodiments will be apparent to persons skilled in the art. The invention is limited only by the following claims.

What is claimed is:

1. An electronics signal chain for an electro-optical detector, said electronics signal chain comprising:
    an integrating auto-zero amplifier circuit having a first input and comprising:
        a first amplifier comprising a first input, a second input, and a first output;
        a second amplifier comprising a first input, a second input, and an output;
        a first coupling capacitor coupled to said first output of said first amplifier and to said first input of said second amplifier, wherein said integrating auto-zero amplifier circuit is adapted to store at least a portion of an auto-zero voltage of said first amplifier across the first coupling capacitor; and
    a detector element in an array, said detector element responsive to illumination and comprising a first terminal and a second terminal, wherein said first terminal of said detector element is couplable to said first input of said auto-zero amplifier circuit.

2. The electronics signal chain of claim 1, wherein said integrating auto-zero amplifier circuit further comprises:
    a first switch adapted to selectively couple said first input of said integrating auto-zero amplifier circuit to said first input of said first amplifier;
    a second switch adapted to selectively couple said first input of said first amplifier to said second input of said first amplifier; and
    a third switch adapted to selectively couple said first input of said integrating auto-zero amplifier circuit to said second input of said first amplifier.

3. The electronics signal chain of claim 2, wherein said second terminal of said detector element is coupled to receive a first reference voltage.

4. The electronics signal chain of claim 2, further comprising a detector interface coupled between said detector element and said auto-zero amplifier circuit.

5. The electronics signal chain of claim 4, wherein said detector interface comprises a bond pad serially coupled to a fourth switch, and said first terminal of said detector element is coupled to said bond pad and said first input of said integrating auto-zero amplifier circuit is coupled to said fourth switch.

6. The electronics signal chain of claim 4, wherein said detector interface comprises a bump bond serially coupled to a fourth switch, and said first terminal of said detector element is coupled to said bump bond and said first input of said integrating auto-zero amplifier circuit is coupled to said fourth switch.

7. The electronics signal chain of claim 4, wherein said auto-zero amplifier circuit further comprises a second input which is coupled to said second input of said first amplifier and wherein said detector interface comprises a bond pad coupled to said second terminal of said detector element and to said second input of said integrating auto-zero amplifier circuit.

8. The electronics signal chain of claim 4, wherein said auto-zero amplifier circuit further comprises a second input which is coupled to said second input of said first amplifier and wherein said detector interface comprises a bump bond coupled to said second terminal of said detector element and to said second input of said integrating auto-zero amplifier circuit.

9. The electronics signal chain of claim 2, wherein said first amplifier comprises a differential, source-coupled pair of MOSFETs.

10. The electronics signal chain of claim 2, wherein said second amplifier comprises a differential, source-coupled pair of MOSFETs.

11. The electronics signal chain of claim 2, wherein said second amplifier comprises a differential, source-coupled pair of MOSFETs in a folded cascode configuration.

12. The electronics signal chain of claim 2, wherein said auto-zero amplifier circuit further comprises a second coupling capacitor coupled between a second output of said first amplifier and said second input of said second amplifier.

13. The electronics signal chain of claim 12, wherein said integrating auto-zero amplifier circuit further comprises a feedback capacitance coupled between said output of said second amplifier and said first input of said first amplifier.

14. The electronics signal chain of claim 13, wherein said feedback capacitance comprises a capacitor.

15. The electronics signal chain of claim 14, wherein said feedback capacitance further comprises at least one transmission gate serially coupled to said capacitor of said feedback capacitance.

16. The electronics signal chain of claim 13, wherein said feedback capacitance comprises a plurality of capacitors coupled in parallel.

17. The electronics signal chain of claim 16, wherein said feedback capacitance further comprises a plurality of transmission gates, each serially coupled to a respective one of said plurality of capacitors.

18. The electronics signal chain of claim 16, wherein said feedback capacitance further comprises a band limiting capacitor coupled between one of said plurality of capacitors and a reference bias.

19. The electronics signal chain of claim 1, wherein said auto-zero amplifier circuit further comprises a second input which is coupled to said second input of said first amplifier, and said second terminal of said detector element is couplable or coupled to said second input of said auto-zero amplifier circuit proximate to an active region of said detector element.

20. The electronics signal chain of claim 1, further comprising:
    an offset circuit coupled to said output of said auto-zero amplifier circuit; and
    a clamp circuit coupled to the offset circuit.

21. The electronics signal chain of claim 2, wherein said auto-zero amplifier circuit further comprises:
    a fourth switch coupled between said first input of said second amplifier and a reference voltage; and
    a fifth switch coupled between said second input of said second amplifier and said output of said second amplifier.

22. The electronics signal chain of claim 1, further comprising:
- an offset circuit coupled to said output of said auto-zero amplifier circuit;
- a clamp circuit coupled to the offset circuit; and
- a sample and hold stage coupled to said output of said auto-zero amplifier circuit and to said clamp circuit, wherein said sample and hold stage selects an output signal from said clamp circuit or from said auto-zero amplifier circuit.

23. The electronics signal chain of claim 22, wherein said sample and hold stage comprises:
- at least one switch coupled between an input of said sample and hold stage and an output of said sample and hold stage; and
- at least one capacitor coupled between said output of said sample and hold stage and a reference voltage.

24. An electronics signal chain for an electro-optical detector, said electronics signal chain comprising:
- a detector element in an array, said detector element responsive to illumination and comprising a first terminal and a second terminal;
- an integrating auto-zero amplifier circuit comprising,
  - a first low noise, fixed gain amplifier, wherein a first input and a second input of said fixed gain amplifier are respectively couplable to a first input and a second input of said auto-zero amplifier circuit,
  - a second high gain amplifier, wherein an output of said high gain amplifier is coupled to an output of said auto-zero amplifier circuit, and
  - a first coupling capacitor, wherein said first coupling capacitor is coupled between a first output of said fixed gain amplifier and a first input of said high gain amplifier and adapted to store at least a portion of an input offset voltage of said fixed gain amplifier;
- a first interconnection adapted to selectively couple said first terminal of said detector element to said first input of said auto-zero amplifier circuit;
- a second interconnection coupling said second terminal of said detector element to said second input of said auto-zero amplifier circuit, said second interconnection located proximate to an active region of said detector element so that said auto-zero amplifier circuit is locally referenced to said detector element;
- a first switch adapted to selectively couple said first input of said fixed gain amplifier to said first input of said auto-zero amplifier circuit;
- a second switch adapted to selectively couple said first input to said second input of said fixed gain amplifier; and
- a third switch adapted to selectively couple said first input of said auto-zero amplifier circuit to said second input of said fixed gain amplifier.

25. The electronics signal chain of claim 24, wherein said second terminal of said detector element is coupled to receive a first reference voltage.

26. The electronics signal chain of claim 24, wherein said first interconnection comprises a bond pad serially coupled to a fourth switch, and said first terminal of said detector element is coupled to said bond pad and said first input of said integrating auto-zero amplifier circuit is coupled to said fourth switch.

27. The electronics signal chain of claim 24, wherein said first interconnection comprises a bump bond serially coupled to a fourth switch, and said first terminal of said detector element is coupled to said bump bond and said first input of said integrating auto-zero amplifier circuit is coupled to said fourth switch.

28. The electronics signal chain of claim 24, wherein said second interconnection comprises a bond pad coupled to said second terminal of said detector element and to said second input of said integrating auto-zero amplifier circuit.

29. The electronics signal chain of claim 24, wherein said second interconnection comprises a bump bond coupled to said second terminal of said detector element and to said second input of said integrating auto-zero amplifier circuit.

30. The electronics signal chain of claim 24, wherein said fixed gain amplifier comprises a differential, source-coupled pair of MOSFETs.

31. The electronics signal chain of claim 24, wherein said high gain amplifier comprises a differential, source-coupled pair of MOSFETs.

32. The electronics signal chain of claim 24, wherein said auto-zero amplifier circuit further comprises a second coupling capacitor coupled between a second output of said fixed gain amplifier and a second input of said high gain amplifier.

33. The electronics signal chain of claim 32, wherein said integrating auto-zero amplifier circuit further comprises a feedback capacitance coupled between said output of said high gain amplifier and said first input of said fixed gain amplifier.

34. A method of auto-zeroing an integrating amplifier circuit for an electrical signal from a detector element, said method comprising:
- decoupling a first terminal of said detector element from said integrating amplifier circuit;
- locally referencing a first stage of said integrating amplifier circuit to a second terminal of said detector element; and
- storing an auto-zero voltage of said integrating amplifier circuit between said first stage of said integrating amplifier circuit and a second stage of said integrating amplifier circuit.

35. The method of claim 34, further comprising coupling the inputs of said integrating amplifier circuit.

36. The method of claim 34, wherein said decoupling a first terminal of a detector element comprises opening a switch coupled between said first terminal of said detector element and a first input of said integrating amplifier circuit.

37. The method of claim 34, wherein said locally referencing a first stage of said integrating amplifier circuit comprises electrically coupling an input of said first stage of said integrating amplifier circuit to said second terminal of said detector element proximal to an active region of said detector element.

38. The method of claim 34, wherein said storing an auto-zero voltage comprises differentially storing said auto-zero voltage of said integrating amplifier circuit between said first stage of said integrating amplifier circuit and said second stage of said integrating amplifier circuit.

39. The method of claim 38, wherein said differentially storing said auto-zero voltage comprises:
- resetting said first stage of said integrating amplifier circuit;
- resetting said second stage of said integrating amplifier circuit;
- referencing said second stage of said integrating amplifier circuit to a reference bias; and
- charging at least a first storage element with said auto-zero voltage.

40. The method of claim 39, wherein said resetting said first stage comprises coupling a first input of said first stage of said integrating amplifier circuit to a second input of said first stage.

41. The method of claim 40, wherein said coupling a first input of said first stage of said integrating amplifier circuit comprises closing a switch coupled between said inputs of said first stage of said integrating amplifier circuit.

42. The method of claim 39, wherein said resetting said second stage comprises coupling a second input of said second stage of said integrating amplifier circuit to an output of said second stage of said integrating amplifier circuit.

43. The method of claim 39, wherein said referencing said second stage of said integrating amplifier circuit to a reference bias comprises coupling a first input of said second stage of said integrating amplifier circuit to a reference voltage.

44. The method of claim 39, wherein said charging at least a first storage element with said auto-zero voltage comprises charging at least a first capacitor with said auto-zero voltage.

45. The electronics signal chain of claim 33, further comprising:
a fourth switch adapted to selectively couple a reference voltage signal to said second input of said high gain amplifier; and
a fifth switch adapted to selectively couple said output of said high gain amplifier to said first input of said high gain amplifier.

46. The electronics signal chain of claim 45, further comprising:
an offset stage coupled to said output of said high gain amplifier;
a clamp stage coupled to said offset stage; and
a sample and hold stage coupled to said clamp stage and to said output of said high gain amplifier, wherein said sample and hold stage selectively receives an output signal from said clamp stage or from said output of said high gain amplifier.

47. A circuit comprising:
a first amplifier having a first and second input and a first and second output;
a second amplifier having a third and fourth input and a third output;
a first capacitor coupling the first output to the third input;
a second capacitor coupling the second output to the fourth input, wherein said first capacitor and said second capacitor are adapted to store at least a portion of an auto-zero voltage of said first amplifier;
a third capacitor coupling the third output to the first input;
a first switch having a first and second terminal and adapted to couple the first input to a first terminal of a detector element;
a second switch adapted to couple the first terminal of the first switch to the second input and apply a reference voltage to said first terminal of said detector element when said first switch has decoupled said first input from said first terminal of said first switch; and
a third switch adapted to couple the first input and the second terminal of the first switch to the second input.

48. The circuit of claim 47, further comprising:
a fourth switch adapted to couple the third output to the third input; and
a fifth switch adapted to couple a first reference voltage to the fourth input.

49. The circuit of claim 48, wherein a second voltage reference is coupled to the second input and a second terminal of the detector element is coupled to a common reference voltage.

50. The circuit of claim 48, wherein the second input is coupled to a second terminal of the detector element.

51. The circuit of claim 50, wherein a common reference voltage is couplable to the second input and to the second terminal of the detector element, the second input coupled to the second terminal of the detector element in close proximity to an active region of the detector element.

52. The circuit of claim 50, wherein the second switch is adapted to shunt current from the detector element.

53. The circuit of claim 48, further comprising a detector interface couplable between the first terminal of the first switch and the first terminal of the detector element.

54. The circuit of claim 48, further comprising:
an offset circuit coupled to the third output;
a clamp circuit coupled to the offset circuit; and
a sample and hold stage coupled to the third output and to the clamp circuit, wherein the sample and hold stage selects an output signal from the clamp circuit or from the third output of the second amplifier.

55. The circuit of claim 48, wherein the first capacitor and the second capacitor store an input offset voltage.

56. The circuit of claim 54, wherein said sample and hold stage comprises a plurality of band-limiting capacitors.

57. The circuit of claim 47, wherein said third capacitor comprises a plurality of parallel capacitors and corresponding transmission gates.

58. The circuit of claim 57, wherein said third capacitor further comprises a band-limiting capacitor.

59. The electronics signal chain of claim 1, wherein said integrating auto-zero amplifier circuit further comprises means for providing capacitance between said output of said second amplifier and said first input of said first amplifier.

60. The electronics signal chain of claim 24, wherein said integrating auto zero amplifier circuit further comprises means for providing capacitance between said output of said high gain amplifier and said first input of said fixed gain amplifier.

* * * * *